(12) United States Patent
Goldschlag et al.

(10) Patent No.: US 9,294,508 B2
(45) Date of Patent: *Mar. 22, 2016

(54) AUTOMATED MULTI-LEVEL FEDERATION AND ENFORCEMENT OF INFORMATION MANAGEMENT POLICIES IN A DEVICE NETWORK

(71) Applicant: CellSec, Inc., Silver Spring, MD (US)

(72) Inventors: David Goldschlag, Silver Spring, MD (US); Karl Ginter, Beltsville, MD (US); Yoav Weiss, Pelach Tivka (IL); Michael Bartman, Potomac, MD (US)

(73) Assignee: CELLSEC INC., Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,825

(22) Filed: Oct. 31, 2013

(65) Prior Publication Data
US 2014/0130119 A1    May 8, 2014

Related U.S. Application Data

(63) Continuation of application No. 13/957,893, filed on Aug. 2, 2013, now Pat. No. 9,171,172.

(51) Int. Cl.
*H04L 29/06*    (2006.01)
(52) U.S. Cl.
CPC .............. *H04L 63/20* (2013.01); *H04L 63/101* (2013.01)
(58) Field of Classification Search
CPC ........... G06F 21/60; H04L 63/20; H04L 5/20; H04L 63/101

USPC ............................................................ 726/1
See application file for complete search history.

(56) References Cited

U.S. PATENT DOCUMENTS

| | | | |
|---|---|---|---|
| 2003/0221124 A1* | 11/2003 | Curran et al. ................. | 713/201 |
| 2005/0268093 A1* | 12/2005 | Proudler ............... | G06F 21/575 |
| | | | 713/164 |
| 2006/0047959 A1* | 3/2006 | Morais .................... | G06F 21/53 |
| | | | 713/166 |

(Continued)

OTHER PUBLICATIONS

Ku et al., Method for Distribution, Execution and Management of the Customized Application based on Software Virtualization, Feb. 2010, The 12th International Conference on Advanced Communication Technology (ICACT), vol. 1, pp. 493-496.*

*Primary Examiner* — Kenneth Chang
(74) *Attorney, Agent, or Firm* — David P. Lentini

(57) ABSTRACT

Methods, apparatus, systems, and non-transitory computer-readable media for managing a plurality of disparate computer application and data control policies on a computing device, especially a computing device connected to a computer network, are described. In one example, at least one policy distribution point is provided that includes least one policy distribution point including at least one information management policy. A plurality of policy enforcement points, including a first policy enforcement point operating at a first policy enforcement level, and a second enforcement point operating at second policy enforcement level, are also provided. A first policy element to the first policy enforcement point, and a second policy element to the second policy enforcement point, are allocated.

A management compartment in computer memory in communication with said computing device including one or more computer applications, data, and metadata specified and controlled by the information management policy is also provided.

25 Claims, 19 Drawing Sheets

(56) References Cited

U.S. PATENT DOCUMENTS

| | | | | |
|---|---|---|---|---|
| 2007/0160079 A1* | 7/2007 | Han | ................. | H04L 12/2602 370/465 |
| 2008/0022136 A1* | 1/2008 | Mattsson et al. | ............. | 713/194 |
| 2008/0066148 A1* | 3/2008 | Lim | ................. | 726/1 |
| 2011/0277038 A1* | 11/2011 | Sahita | ................. | G06F 21/6281 726/27 |
| 2012/0023546 A1* | 1/2012 | Kartha et al. | ................. | 726/1 |

* cited by examiner

AUTOMATED MULTI-LEVEL FEDERATION AND ENFORCEMENT OF INFORMATION MANAGEMENT POLICIES IN A DEVICE NETWORK

1 CROSS-REFERENCE TO RELATED APPLICATIONS

This application claims priority under 35 U.S.C. §120 to co-pending U.S. patent application Ser. No. 13/957,893 filed 2 Aug. 2013, which application claims priority under 35 U.S.C. §119(e) to provisional U.S. Patent Application Ser. No. 61/678,677 filed 2 Aug. 2012. The entire disclosure of each application is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2012-2013, CellSec Security Limited.

3 BACKGROUND OF THE INVENTION

3.1 Field of the Invention

The technologies described herein relate to systems, software, and methods for the multi-level federation, allocation, distribution, and enforcement of information management policies in networks of computing and communications devices, and more particularly, to the multi-level federation, allocation, distribution, and enforcement of separately-sourced information management policies over a plurality of disparate sets of information within one or more such devices. The present invention has applications in the areas of computer science, computer network management, and computer security.

3.2 The Related Art

There have been many attempts to develop systems for information management policy enforcement that implement information protection (including preventing information leakage and limiting or controlling information movement) for information that is either "at rest" (i.e., information that is not subject to some change in state or location) or "in motion" (i.e., information that is subject to change of state or location). Current systems have addressed one or more aspects of the overall problem, but none has provided a complete solution. In fact, current systems are mutually exclusive, preventing even simple combinations of techniques on a single platform to provide enforcement using combinations of systems.

One particularly difficult challenge is that networks typically include devices that often have diverse capabilities for implementing policy controls, sometimes as a result of having differing operating systems, protection software, or configuration options. Existing implementation techniques require common capabilities across all devices, and often require a monolithic control structure. Alternatively, these techniques require the installation of common policy enforcement software, or require a set of parallel control silos that are not interoperable. Furthermore, existing techniques do not support integrating protection methods, e.g. protection of information while in use and protection while at rest are not addressed by any single solution. These requirements effectively prevent the sort of federation, allocation, and distribution of policies needed to provide protection for information at rest and in motion.

For example, among the existing techniques are those that segregate information on the basis of its type thereby preventing access to, or co-mingling of, different types of information. Other existing techniques segregate information by the user currently in possession of the information (e.g., UIC-based protections and access control lists), or the application that uses the information (e.g, iOS or Android OS application isolation). These techniques are typically implemented at the operating system level, are applied indiscriminately to all information on a device, and presume a single, common specification for control. Such assumptions are unacceptable for real world device use. For example, systems that permit "bring your own" devices (e.g., so-called smartphones, tablets, and laptops) cannot employ these techniques due to the plurality of sources of policy control, such as the device owner, an enterprise IT department, a network service provider, and operating system (OS) vendor.

Additional challenges are present when policy enforcement components are embedded within the device operating system or firmware, which is often done to make the make enforcement hard to circumvent. This has the effect of causing the policy enforcement methods to be predetermined and inflexible. Alternatively, the system can require privileged access to install the necessary policy enforcement components on the device. However, in some cases it is not possible to install policy enforcement components at the operating system or firmware level due to a lack of privileged access permissions (e.g., root or administrator access). In other implementations, policy enforcement systems require specially developed applications or modification of stock applications in order to make the applications operate with desired protections. These limitations combine to restrict the installation and use of policy enforcement components on a device, and restrict the activities of users by limiting their access to only those applications that have been customized to operate with the policy enforcement paradigms.

Existing information flow enforcement mechanisms, in addition to requiring privileged access while running on a device, are often limited in the types of information flows they can manage. To maintain policy-mandated control over information at rest, in motion, and in use, some means of managing information flow is required that can deal with all types of information flow under a single policy. What is needed is a system that may be installed and operated using whatever system resources and privileges are available, without requiring specially modified applications, and that may provide additional dynamically installed and configured controls over information and applications to augment protection available on the device as required to implement the specifications of the current policy.

Provision of forms of information control that better meet real world needs have been offered that isolate applications and their data under control of information owners, with policy control over information access and sharing by applications. One example of such an approach is described in co-pending U.S. patent application Ser. No. 13/316,426, which is incorporated herein by reference in its entirety and for all purposes. However, while such an approach is an important improvement over prior systems, it does not support a plurality of different points of control, where the control is effectively integrated and implemented by a device, or by an architecture comprising a plurality of devices, with each point of control having exclusive authority over its own data at all times.

The need remains for a common, integrated solution that provides for segregation, protection, and control of information on one or more devices while that information is at rest, in motion, or in use, and against such common perils as corruption of the information or loss of the device. The present invention meets these and other needs.

4 SUMMARY OF THE INVENTION

The present invention provides methods, systems, apparatus, and non-transitory computer readable media that enable the management of a plurality of disparate computer application and data control policies on a computing device. As will be appreciated by those having ordinary skill in the art upon reading the specification and accompanying figures, the present invention addresses the deficiencies and shortcomings of the prior art and meets the needs of current computer policy management. In particular, by providing policy distribution an enforcement points that operate at different policy enforcement levels, and distributing policy enforcement elements among the policy enforcement points, the invention enables a fine degree of control and flexibility of policy management unavailable in the prior art. The various embodiments of the invention include, but are not limited to, the following In a first aspect, the present invention provides a method for managing a plurality of disparate computer application and data control policies on a computing device. In some embodiments, the methods provided by the invention comprising: providing at least one policy distribution point, said at least one policy distribution point including at least one information management policy; providing a plurality of policy enforcement points, including a first policy enforcement point operating at first policy enforcement level, and a second policy enforcement point operating at second policy enforcement level; allocating a first policy element to said first policy enforcement point, and a second policy element to said second policy enforcement point; and providing a management compartment in computer memory in communication with said computing device, said management compartment including one or more computer applications, data, and metadata specified and controlled by said at least one information management policy.

More specific embodiments of the exemplary methods just described further comprise defining the management of said one or more computer applications, data, and metadata in said management compartment for at least one of a rest state, a motion state, or a use state. Still more specific embodiments of these further comprise defining the management of computer applications that access data or metadata contained in said management compartment.

Other more specific embodiments of those exemplary embodiments described initially further comprise defining the management of computer applications, data, and metadata contained within said management compartment. Still others further comprise defining the management of computer applications, data, and metadata contained in two or more different management compartments. Yet others further comprise defining the management of computer applications, data, and metadata contained in two or more different instances of said management compartment. And yet still others further comprise distributing said at least one information management policy through said one or more policy distribution points.

In a second aspect, the present invention provides systems for managing a plurality of disparate computer application and data control policies on one or more computing devices. Exemplary embodiments of such systems comprise at least one policy distribution point, said at least one policy distribution point comprising at least one information management policy; a plurality of policy enforcement points, including a first policy enforcement point operating at first policy enforcement level and enforcing at least a first policy element of said at least one information management policy, and a second policy enforcement point operating at second policy enforcement level and enforcing at least a second policy element of said at least one information management policy; and a management compartment in computer memory in communication with said computing device, said management compartment including one or more computer applications, data, and metadata specified and controlled by said at least one information management policy.

More specific embodiments of these exemplary system embodiments include those for which the management of said one or more computer applications, data, and metadata in said management compartment is defined for at least one of a rest state, a motion state, and a use state. Of these more specific embodiments, still more specific embodiments are those wherein said management compartment is configured to manage computer applications that access data or metadata contained in said management compartment. Yet more specific embodiments include those for which said management compartment is configured to manage computer applications, data, and metadata contained within said management compartment. And still more specific embodiments are those wherein said management compartment is configured to manage computer applications, data, and metadata contained two or more different management compartments.

Among the originally described exemplary system embodiments, other more specific embodiments are those wherein said management compartment is configured to manage computer applications, data, and metadata contained within said management compartment. Still other specific embodiments of the originally described example embodiments are those wherein said management compartment is configured to manage computer applications, data, and metadata contained in two or more different management compartments. Yet other more specific embodiments of the original exemplary system embodiments are those which comprising defining the management of computer applications, data, and metadata contained in two or more different instances of said management compartment; and those which further comprising distributing said at least one information management policy through said one or more policy distribution points.

In a third aspect, the present invention provides a non-transitory computer readable medium containing a computer program product providing data and instructions configured to enable a computer to manage a plurality of disparate computer application and data control policies on at least one computing device, said computer program product comprising instructions to enable said computer to: establish and operate a plurality of policy enforcement points configured to receive at least one information management policy provided by one or more policy distribution points, said policy enforcement points further including a first policy enforcement point operating at first policy enforcement level, and a second enforcement point operating at second policy enforcement level, said first policy element being allocated to said first policy enforcement point, and said second policy element being allocated to a second policy enforcement point; and establish and operate at least one management compartment in computer memory in communication with said computing device, said management compartment including one or more computer applications, data, and metadata specified and controlled by said at least one information management policy.

More specific embodiments of the exemplary media just described further comprise defining the management of said one or more computer applications, data, and metadata in said management compartment for at least one of a rest state, a motion state, or a use state. Still more specific embodiments of these further comprise defining the management of computer applications that access data or metadata contained in said management compartment.

Other more specific embodiments of those exemplary embodiments described initially further comprise defining the management of computer applications, data, and metadata contained within said management compartment. Still others further comprise defining the management of computer applications, data, and metadata contained in two or more different management compartments. Yet others further comprise defining the management of computer applications, data, and metadata contained in two or more different instances of said management compartment. And yet still others further comprise distributing said at least one information management policy through said one or more policy distribution points.

These and other aspects and advantages will become apparent when the Description below is read in conjunction with the accompanying Drawings.

5 BRIEF DESCRIPTION OF THE DRAWINGS

The features of the present invention will best be understood from a detailed description of the invention and example embodiments thereof selected for the purposes of illustration and shown in the accompanying drawings in which.

Figure 1:
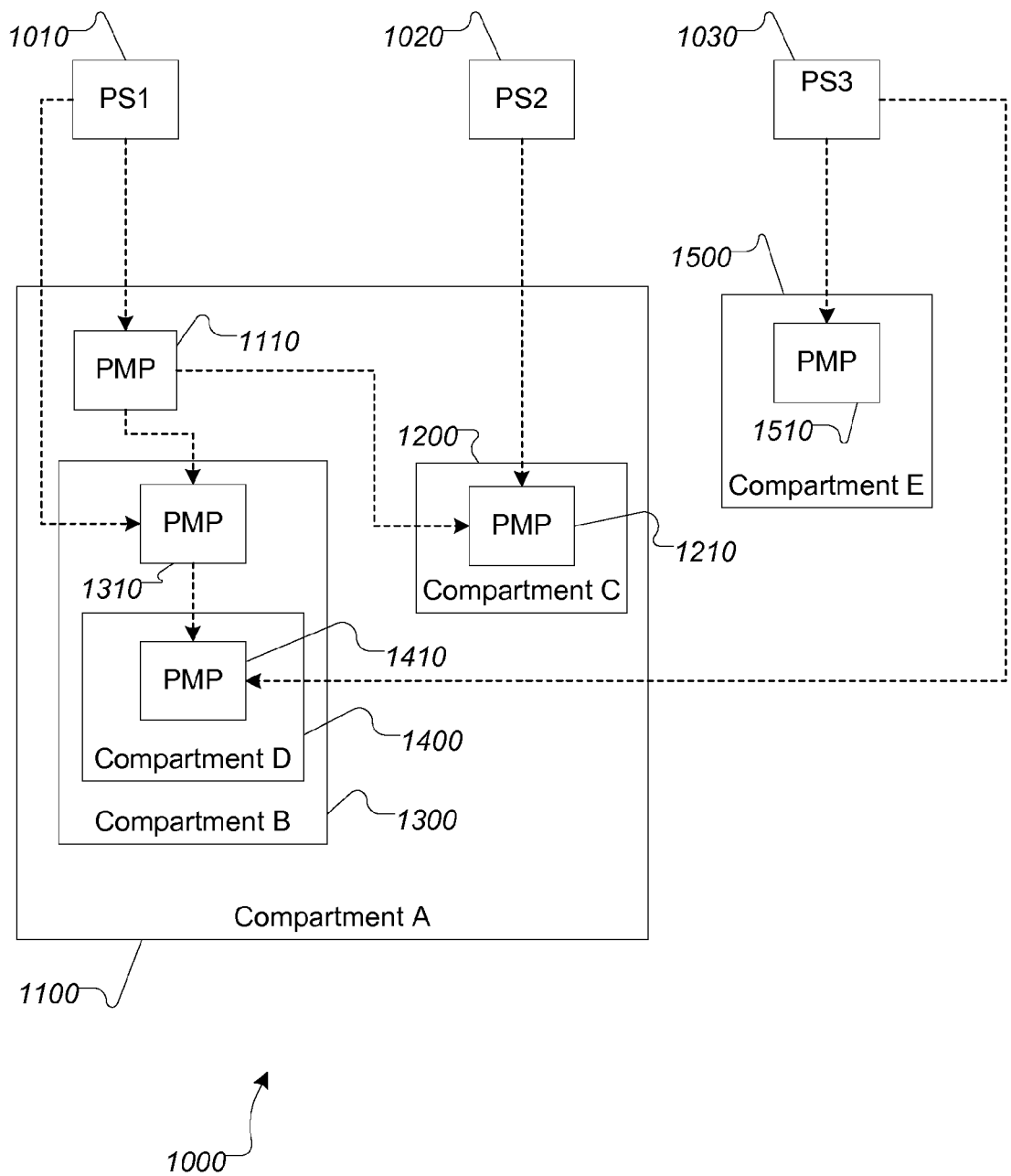
FIG. 1 is a diagram showing a plurality of compartments, some in a nested compartment relationship.

6 DESCRIPTION OF SOME EMBODIMENTS OF THE INVENTION 6.1 Definitions

The following definitions are used throughout, unless specifically indicated otherwise:

| Term | Definition |
| --- | --- |
| Aggregation | Collecting disparate components and removing duplicate components, so as to create a single component result. Aggregation can also comprise resolution of conflicts between collected disparate components. |
| Application | A program that can be operated by, or in support of operations by, a user, e.g., e-mail, web browser, or contacts database. |
| Application, Compartmented | An Application that is either a Shared Application or a Private Application. |
| Application, Global | An application that is installed or runs outside of a compartment. |
| Application instance | An application, along with specific data associated with that application, such as configuration data. |
| Application, Private | An application that is installed only within a compartment, i.e., the only copy of the application that can be accessed by a user is the copy accessed through an application policy enforcement point. There is no provision for startup of the application independent of the application policy enforcement point. |

-continued

| Term | Definition |
|---|---|
| Application, Shared | An application that is installed outside of a compartment and also within a compartment, i.e., the application is installed on a device, and can be run like any device application, but there is also an application policy enforcement point for the application that permits running the application within at least one compartment. The resources accessible to the application may differ depending on how the application is started and the policies of the device and/or a compartment that incorporates the application. |
| Compartment | A compartment is a persistent logical construct that describes the persistent segregation of applications and data, such segregation defined at least in part by a policy that identifies one or more applications, data, permitted- or prohibited operations, by those applications upon the data as well as interactions with other applications in the compartment and with applications and systems outside of the compartment.<br>A compartment is defined, in part, by a logical association of applications, information (data and metadata), policies, policy management points and policy enforcement points effective to manage and control information storage, use and movement. Compartments are sometimes referred to by those with skill in the art as "domains" or "information domains". |
| Compartment Component | Any of the applications, data, metadata, policy, policy management points, policy enforcement points, or compartment-specific policy enforcer components, or any combination of these. |
| Compartment Instance | The set of Compartment Components required to implement the requirements of a specific compartment on a single device as instantiated on that device. |
| Control | Allow actions that are permitted, ensure that required actions are carried out, and/or prevent actions that are prohibited. |
| DIEPEP | Acronym for "Domain Import-Export Policy Enforcement Point": An application that mediates information movement between compartments or into or out of one or more compartments on the basis of one or more policies allocated to the DIEPEP. |
| Federate | To form a single integrated unit, within which each constituent parts maintains some internal autonomy. |
| Information | Data and metadata usable by one or more applications. |
| Manage | Implement control on information, or applications, or both. |
| Manage in accordance with a policy | Implement information or application controls (or both) as specified by a policy. |
| Mediate | Mediation comprises permitting, blocking, modifying, or making a record (individually or in any combination) of at least one operation requested by an application instance. |
| Policy | One or more policy elements. |
| Policy, Complete | One or more policy elements aggregated into a policy, with duplicate elements removed and any conflicts between policy elements resolved. |
| Policy Distribution Point | A computer-implemented component of a device for distributing or making available at least one policy to one or more Policy Management Points. |
| Policy Element | One or more policy fragments. Policy Fragments that form a policy element are typically related to a single aspect of policy, such as defining access permissions to a given file or file type, specifying network access restrictions for a device or type of device, or specifying one or more permitted applications for a compartment. |
| Policy Enforcement Point | A computer implemented component of a device capable of receiving a policy and enforcing the requirements specified therein using one or more policy enforcers. |
| Policy Enforcer | A computer implemented software and/or hardware component, an aspect of an operating system, a service, a process, an application or other employable feature on a device useful for enforcing at least one element of at least one policy. |
| Policy Fragment | Individual policy definitions, rules, permission or restriction specifications, specifications of scope, etc., useful for defining aspects of policies. Policy fragments can be combined to form policy elements. |
| Policy Management Point | A computer implemented component of a device capable of aggregating at least one policy, resolving conflicts between policy elements therein, allocating some or all policy elements of the resulting complete policy to one or more policy enforcement points or delegating some or all policy elements of the resulting complete policy to one more other policy management points. |
| Workflow | A sequence of operations typically carried out by a user invoking one or more applications simultaneously or in parallel to accomplish at least one task. |

6.2 Overview

The present invention provides systems, methods, apparatus, and non-transitory computer readable media for the segregation, protection, and control of information on one or more devices while that information is at rest, in motion, or in use, and against such common perils as corruption of the information or loss of the device. In one aspect, as will be understood by those having ordinary skill in the art, the invention enables the dynamic definition of a plurality of information compartments upon a group of one or more devices as specified by a collection of policies. The policies may be sourced from a single policy source, or alternatively, from a plurality of policy sources.

Among the capabilities and advantages provided by the invention are the following:

- At rest protections for protection of information for privacy and integrity, and for local endpoint (e.g., where data is stored) attribute determination. Local endpoint attributes can include, but are not limited to, techniques (enforced by policy enforcement points) for information segregation, persistent tagging, encryption, and data signing, as well as non-volatile storage specification, configuration, and permissioning.
- In motion protections for the protection of information while it is moved between at-rest storage locations, applications or other in-use locations, over a network, or any combination of these. In motion protections also provide for endpoint determination and limitation. Endpoint determination involves determination of which information movement components are permitted access to the information, or which information movement components are required when accessing information, as well as any restrictions, requirements, or permitted options when doing so. For example, policy can specify that information be moved only using a specific VPN connection, and that the movement be only to a particular URL. In motion protection include techniques (enforced by policy enforcement points) such as encryption, communications and messaging intercepts, information tagging, and endpoint verification.
- In use protections for the protection of information while the information is being processed by applications, or by hardware components such as cryptographic chips, signal processing components, etc. In use protections can be implemented using such techniques as process isolation, limiting input/output operations and inter-process communications, information identification and tagging, restricted execution environments, and trusted computing methods.

Protection against common perils can include automated backup and synchronization between non-volatile storage locations of information identified as being part of a compartment, tracking of compartment data access through maintenance of audit trails, checksums to detect corruption, remote data deletion for lost or stolen devices, etc. Backup and synchronization of compartments is performed by one or more computers implementing one or more aspects of the policy. The policy may comprise policy elements that encode specifications of the application or compartment component to use for backup or synchronization. These specifications may further encode, for example, information that describes when to perform backup or synchronization (e.g., at compartment initialization, when compartmented information changes, how much change to compartment information is necessary to trigger backup or synchronization, periodically, when user requests it, when compartment is destroyed, etc.), how information in the compartment is to be tagged or marked, and how compartmented information is to be protected during backup or synchronization.

Existing information can be compartmented without modification. There is no requirement that information be initially created within a compartment, or maintained continuously within a compartment, for the information to be compartmentalized.

Other aspects of the present invention permit operation of compartments in real-time based on the current state of the device in combination with the current policy for each compartment, and do not require the existence or selection of additional operating states or modes to specify a compartment or determine the proper policy. For example, the policy elements to be used for compartment management and control may be determined at the time of use (e.g., a user selecting a particular application, or exporting information from a particular application that is defined as part of a particular compartment), upon past actions (e.g., setting a timer to activate an application), by selecting particular data to be processed, or by current device connectivity or location. The ability to operate in this way is referred to herein as "modeless" operation and is of particular advantage when operating in environments where a plurality of independently defined compartments are present upon a device. As a result of having a modeless operating capability, the user is freed from any need to specify which compartment to use prior to performing some activity. As a result of modeless operation in combination with determining policy requirements at the time an action requiring such determination is taken, policy changes can be made immediately available without requiring a reload of the operating system, restarting an application, forcing the user to sign off and then back on, or selecting a different operating mode. By making compartment determination automatic, the possibility that a user will select the wrong compartment, be using an outdated policy, or fail to activate a compartment before performing some activity, is avoided and information protection is enhanced.

Unlike some prior art systems that determine applicable policy for based on the tagging the information, the current invention determines the applicable policy for any given information based on the compartment that is currently mediating access to the information. Access to the information is controlled by the policy of that compartment and no other compartment can access the information in violation of that policy.

6.3 Compartments

The present invention supports flexible implementation of information segregation and protection using a plurality of device-specific protection techniques utilizing information management policy specifications from one or more sources. These policy sources may be managed by a single entity, by a plurality of related entities, by a plurality of unrelated, independent entities, or by a combination of related and unrelated entities.

In one embodiment, the present invention provides for one or more individual policy specifications (collectively, "policies") that define one or more compartments on each device, and for the creation of federated policies for which the constituent policy elements have been pre-aggregated and de-conflicted to provide a single cohesive policy. As will be appreciated by those having ordinary skill in the art, the present invention enables policy specification, federation, allocation, distribution, and enforcement for policies specifying the different components and operational limitations of one or more information compartments. These policies, in conjunction with the policy allocation, distribution, and enforcement mechanisms, are implemented by the processor of a device so as to protect the information that is part of each compartment on the device in the manner specified by that compartment's controlling policies. Each compartment is defined at least in part according to, assembled in accordance with, and enforces the information and application management specified by, one or more policy elements. Compartment policies are implemented using various policy enforcement techniques available to the protection architecture, as implemented on the device enforcing the protections. Provision of such compartments and policies can be accomplished by those having ordinary skill in the art.

In at some exemplary embodiments, the forgoing involves use of one or more compartment components comprised of policy distribution points, policy management points, and policy enforcement points. In some exemplary implementations, a given compartment can be implemented on and across a plurality of devices having differing capabilities using a common policy specification, where the plurality of devices host compartment components that interoperate in order to provide the policy-specified protections for information contained in the compartment. This is possible because the allocation process allocates policy elements to policy enforcement points differently in accordance with the capabilities of the policy enforcement points present or known to a policy management point. In yet other exemplary implementations, some or all of the policy can be encoded as part of one or more policy enforcement points that may be distributed to a device on a one-time or as-needed basis. Such distributable policy enforcement points are installed and enforce their allocated policy beginning when they are instantiated or at such later time or times as otherwise required by policy. In other exemplary implementations such distributable policy enforcement points supplement or replace predefined policy or policy enforcement points (or both) with new policy or policy enforcement points (or both) provided by other aspects of the protection architecture and/or that are provided by the devices the compartment exists on. Provision of such compartments and policies can be accomplished by those having ordinary skill in the art.

The present invention supports the specification, creation, and simultaneous use of a plurality of compartments on each device, each compartment enforcing its information management policy. In some implementations, a policy distribution point defines and distributes policy elements for diverse independent entities, such as, for example, different employers, social organizations, or device users; for a single entity; or for a set of related entities; and policy management points substantially simultaneously implement policy elements from a plurality of diverse independent entities. Thus, a specific device may implement distinct compartments that segregate, protect, and manage information of a plurality of entities, such as an employer, a volunteer organization, and family, where each of the entities has differing segregation, protection, and management requirements. Provision of such compartments and policies can be accomplished by those having ordinary skill in the art.

Unlike current multiple compartment systems which are centrally managed overall or commonly managed by the operating system at a device level, the present invention enables compartment management independently of device's capabilities (e.g., at a compartment level), where compartments are managed independently of each other. Managing compartments separately, and without the requirement of sharing policy enforcement components between them, improves the security of the system overall, since a breach of one compartment does not affect other compartments on a device. In some embodiments, a compartment's policy is not available to other compartments or un-compartmented components on a device, unless permitted by the compartment policy. In still other embodiments, enforcement of compartment policy on a given device is done without requiring support external to the device once any required compartment components are present and available on the device. Ongoing compartment security checks (such as certificate validation) are not required.

In addition, the present invention does not affect the management of information that is not in any compartment, but which may nevertheless govern interactions between one or more defined compartments and such un-compartmented information.

One aspect of the present invention's implementation of compartments is that the compartment policy defines how information is to be managed in its various states (i.e., at rest, in motion, and in use). This differentiates the present invention from other technologies that can only deal with information in one state (e.g., at rest or in motion). As described above, controlling information in each of its states is a significant challenge in that current techniques for managing information typically have mutually exclusive attributes. For example, data at rest may be protected by file protections that specify the user or users that can access it (e.g., UIC-based or ACL-based protections and/or optional encryption of the physical media). Data in motion (e.g. information transferred between applications and/or compartments, and including information transferred between devices by network protocols such as FTP or HTTP) may be protected using differing technologies and when information comes to rest at a destination, the protections are specified by the at rest protections of the destination compartment and have no relation to the protections of the source compartment. Unlike current systems, the protections used for the source compartment, during in-motion protections, and at the destination compartment may be defined at the high level as a set of information protection policies that are implemented differently as the policy elements are allocated to disparate devices. For example, at the destination device, the information may be protected at rest using file system encryption and ACLs, is protected while in motion between the devices by a VPN tunnel, and at the source device, the information is stored within a compartment comprising a database utilizing the database native encryption and a digital rights management policies. The flexible mapping of policy requirements (e.g., data a rest policy that information must be stored encrypted) to specific implementations (e.g., the file system encryption and ACLs on the destination device and the database encryption on the source device) provides significant advantages over static allocation schemes in current systems.

In particular, the present invention does not impose limits upon the number of policy-defined compartments or limit the contents of each compartment except in accordance with the compartment's policy specifications (e.g., number, type, or identity of applications, amount or type of information, types of controls and management over applications and/or information, or how information may be moved or shared) as long as there are sufficient physical resources (e.g., memory) and policy-appropriate policy enforcement points available to enforce compartment policy. This enables flexibility of deployment, where only the necessary parts of the system must be deployed to a specific device, based upon the compartments and control and management features required. This potentially provides a substantially smaller implementation footprint than is required by prior systems.

6.3.1 Intra-Compartment Information Access and Sharing

The present invention supports policy-defined specification and management of information access and sharing within compartments. In some implementations, such management can be specified by policy to apply to particular sub-sets of information in a compartment, so that, for example, a first part of the information used by a first application can be shared with a second application while a second part of the information used by the first application cannot be shared with the second application. Compartment policy can also specify a complete block of information sharing, or unrestricted sharing within the compartment, as well as control where or how information can be accessed or shared (e.g., only when the device is located in the office, only when not in the office, only when connected to a specific VPN, etc).

6.3.2 Inter-Compartment Information Sharing

The present invention enables policy-defined specification and management of information access and sharing between applications within a compartment and applications that are not part of the compartment. The present invention also supports the policy-defined specification and management of information access and sharing between applications that are in different compartments. In some implementations, the management can be specified to encompass only sub-sets of the information being accessed or shared, so that a first part of the information accessed by a first application can be shared with a second application but a second part of the information accessed by the first application is not shared with the second application. When sharing information between compartments, the policy of each compartment involved permits the sharing, and sharing is only permitted to the extent allowed by the policies of each compartment. Compartment policies can also specify a complete block of information sharing, or unrestricted sharing, between specified compartments, as well as control where or how information can be shared (e.g. only through a specific VPN, etc).

6.3.3 Inter-Instance Compartment Information Sharing

The present invention further supports the policy-defined specification and management of information between instances of a compartment on the same or on disparate devices. Policy can specify how information is accessed between compartment instances. For example, requiring that data be encrypted while in motion between two devices that each support an instance of the compartment, or that data be moved through a specified VPN or using a protocol with specific characteristics, such as error checking or encryption of data. Policy can also specify authentication methods and means for recognition and verification of compartment instances, such as certificate exchange, use of compartment encryption keys for encrypting inter-instance communication, etc.

6.3.4 Extra-Compartment Information Sharing

In some embodiments compartmented data is shared outside of its compartment, to the extent permitted by compartment policy, even if one of the involved applications is not in any compartment. For example, it can be useful to have a calendar display that includes both personal and work appointments. Application policy enforcement points that encapsulate content providers can enable such sharing within policy limits by redirecting data access to aggregate data from more than one other content provider application. For example, when a calendar display application requests data from an encapsulated calendar content provider, the application policy enforcement point can pass the request through, and supply the data the calendar content provider sends out to the requester, but it can also copy the query to other content providers, such as those in other compartments, and supply that data as well to the requester. As will be appreciated by those having ordinary skill in the art, in such cases, the policy of each involved compartment must permit the sharing of the respective compartment data.

6.3.5 Inter- and Extra-Compartment Information Sharing

In some embodiments, compartments enable policy-controlled management of a set of applications, data from applications, and data that are in other compartments or that are not compartmented. In some more specific embodiments, information use may involve applications that are in a plurality of compartments; this use requires that applications interoperate without violating compartment policies, even though compartments may have different controlling entities, each of which has, and enforces, its own policy, and each of these entities may or may not coordinate their policies.

In some embodiments, policy, comprising one or more policy elements, is supplied using one or more policy distribution points to Policy Management Points that allocate the constituent policy elements to one or more policy enforcement points that implement the compartment protections. In more specific embodiments where this is the case, when a user's use involves crosses compartments, or requests the use of components that are a part of a specific compartment, those involved compartments require policy elements that permit the desired interaction (unless such interaction is forbidden). Absent a policy element that allows the desired interaction(s) between compartment, or that permits the interaction between a compartment and components external to the compartment, the requested use of the compartmented components is blocked.

6.3.5.1 Nested Compartments

In some embodiments, the present invention provides nested compartments, i.e., where a second compartment is instantiated within the operating footprint of a first (outer, containing) compartment, and which second compartment is at least partly controlled by the policy of the outer, containing, compartment. Containing and nested compartments may be controlled (i.e., have their policy specified) by the same or by different entities. Such embodiments can be implemented by those having ordinary skill in the art.

A nested compartment is useful when a compartment is defined by a first entity that includes a compartment defined, at least in part, by a second entity. This occurs when the first entity is an organization and the second entity is an outsourced supplier, and the compartment provided by the supplier is part of a large organization-wide protection system defined for the organization. Policy supplied by a containing compartment permits nested compartments to interchange data with each other to an extent specified by the outer (containing) compartment policy.

Nested compartment policy comprises policy elements that permit nesting within the containing compartment for containing compartment policy elements to be aggregated into nested compartment policy. In some embodiments, nested compartment policy limits nesting in various ways, such as specifying which compartments can function as containing compartments, how many levels deep that nesting is permitted, what requirements containing compartment policy must meet, time limits on nesting, etc.

In other embodiments, containing compartments delegate some or all of the containing compartment policy to nested compartments. For example, containing compartments may delegate only policy elements having to do with inter-compartment interactions, and not delegate policy elements having to do with which compartments can be nested compartments.

FIG. 1 shows an exemplary nested compartment arrangement (1000). There are three policy distribution points (PS1 (1010), PS2 (1020), and PS3 (1030)) that supply policy elements to various compartments (1100, 1200, 1300, 1400, & 1500). Compartment A (1100) receives policy from PS1 (1010) and contains Compartment B (1300) and Compartment C (1200). Compartment B (1300) also receives policy from PS1 (1010) as well as policy from the policy management point of Compartment A (1110). Compartment C (1200) receives policy from both PS2 (1020) and Compartment A's policy management point (1110).

Compartment B (1300) contains nested Compartment D (1400), which receives policy from Compartment B's policy management point (1310), as well as from PS3 (1030). In general the policy distribution points (1010, 1020, & 1030) are required to establish the compartments, that is to provide the initial compartment policy for each compartment and to provide policy elements that permit the nesting shown, whether as container compartments or nested compartments. A given compartment can receive policy directly from a policy distribution point, or, policy permitting, receive it as delegated from a containing compartment policy management point.

In some embodiments, nested compartment arrangements are created through specification of the required policy elements in the policy for each involved compartment. In more specific examples of such embodiments, policy elements specify whether acting as a container or nested compartment is permitted, which compartments can be nested in or used to contain a compartment, and any restrictions on inter-compartment interactions, such as delegation of policy between compartments, communication restrictions, or data exchanges, etc. In still more specific examples of these embodiments, applications are specified as mandatory applications conditional on compartment nesting as well.

For example, a given application may be mandatory only if a compartment is acting as a container for a nested compartment, or only mandatory if a compartment is nested within another compartment. Likewise, policy can specify that applications are optional or not permitted based on compartment nesting relationships. When policy establishing nesting relationships is received by a policy management point, any mandatory applications required by such nesting relationships are acquired, installed, and instantiated, as specified by policy. Applications that are not permitted in such cases are dealt with in the same manner as if policy had changed to prohibit them.

6.3.5.2 Federated Compartments

In another aspect, the present invention provides federated compartments. The federated compartments architecture is based on the concept of using compartment policy to specify interactions that are permitted between compartments if they are members of the same federation group. For example, an enterprise can request that the DropBox compartment include policy that permits interchange with the enterprise compartment, and that the SalesForce compartment also permit interchange with the enterprise compartment. Such architectures can be implemented by those having ordinary skill in the art using the disclosures and teachings herein.

In some embodiments, federation member compartments are listed in the compartment policies of each compartment with membership in the federation group, or membership can be determined based on possession of a federation key, certificate, or other proof in conjunction with compartment policies specifying permission to interact with compartments supplying such proof.

In more specific examples of these embodiments, a request that a compartment be included in a given federation is required. Such requests can be made manually, such as through use of a web page to supply a request, a key, a certificate, or other necessary means for a compartment to participate in a federation group. Alternatively, requests can also automated, or semi-automated, such as through use of a federation request protocol used by one or more software applications. A request is evaluated and either granted or denied. If a request is granted, then the compartment policy is altered so as to include the requesting compartment in the federation group. If the request is denied, then no change to compartment policies is required.

In still more specific examples of such embodiments, if a request for federation group membership is granted, limitations on the devices, applications, etc. that are permitted to interact between federated compartments are still provided. This is consistent with intra-compartment functionality, where being included in a compartment does not prohibit policy from denying some interactions between compartment applications.

Figure 2:
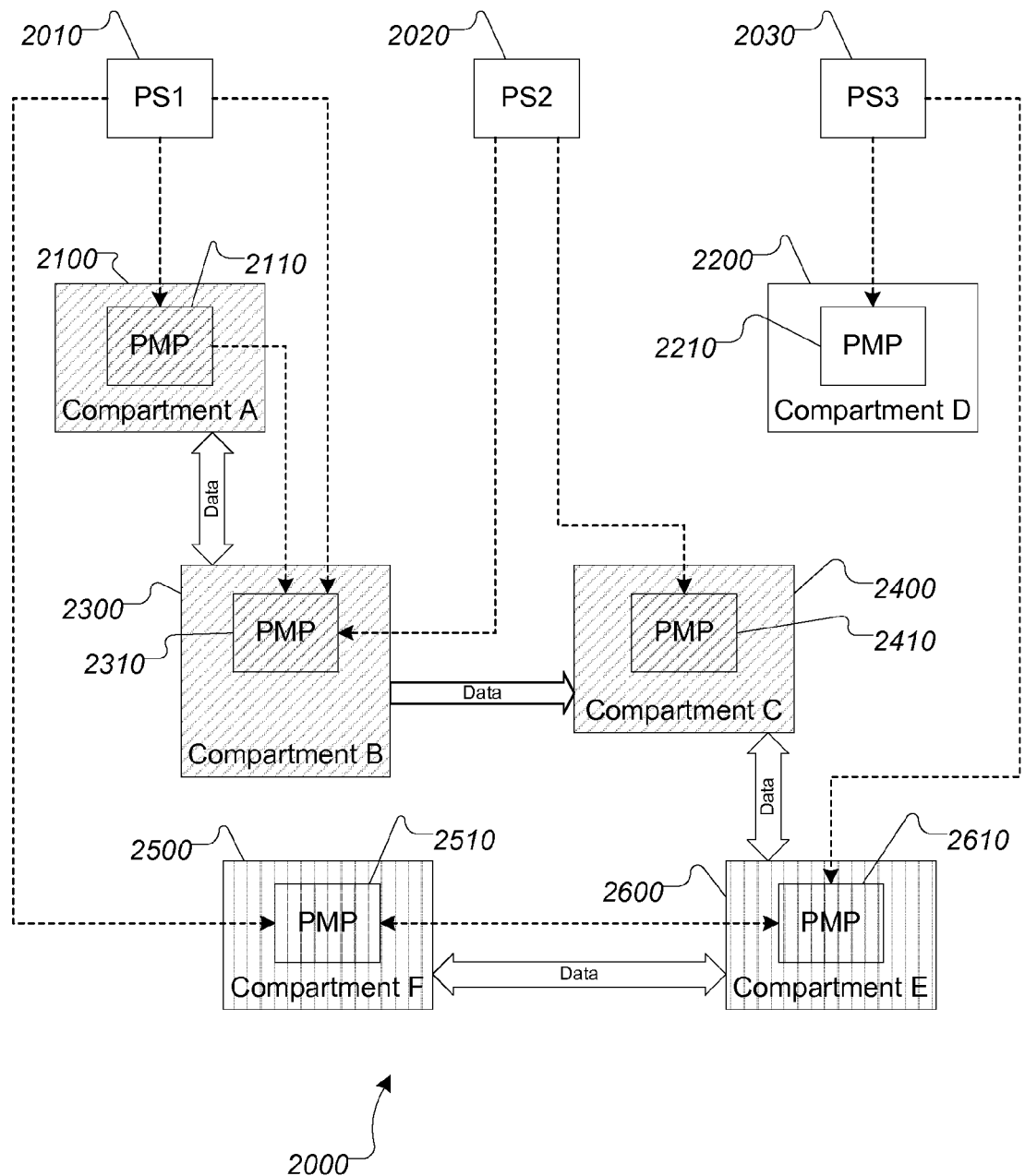
FIG. 2 is a diagram showing a plurality of compartments, some in a federated compartment relationship.

FIG. 2 shows an example of a federated compartment arrangement (2000). Compartments A (2100), B (2300), and C (2400) form one federated group; Compartments F (2500) and E (2600) form another federated group; and Compartment D (2200) is un-federated. (The member compartments of each federated group are hatched differently; Compartment D is not hatched.) As shown by the dashed lines, policy distribution point PS1 (2010) supplies policy to the policy management points (2110, 2210, 2310, 2410, 2510, & 2610) in compartments in both federated groups (A (2100), B (2300), and F (2500)).17500)). Policy distribution point PS2 (2020) supplies policy to compartments B (2300) and C (2400), and policy distribution point PS3 (2030) supplies policy to Compartments D (2200) and E (2600).17600). Compartment B (2300) also receives policy elements from Compartment A (2100) to the extent permitted by Compartment B's (2300) policy. Compartments F (2500) and E (2600) can supply policy elements to each other to the extent permitted by their respective policies.

As shown in the example illustrated in FIG. 2, data interactions are permitted between compartments A (2100) and B (2300) bi-directionally, but only uni-directionally from compartment B (2300) to compartment C (2400). Compartment E (2600) can exchange data bi-directionally with both Compartment F (2500), within its federated group, and with Compartment C (2400) in the other federated group; that is, inter-compartment data exchanges are not affected by federation membership, and function as they would absent the federated relationship. Federation has to do with policy sharing between compartments, as with Compartments A and B (2100 & 2300) and E and F (2600 & 2500). Other arrangements will be apparent to those having ordinary skill in the art.

In other embodiments, federation membership is used as a factor in policy elements controlling inter-compartment data sharing. For example with continued reference to FIG. 2, even through Compartment C (2400) gets policy only from PS2 (2020) and does not permit policy sharing from A (2100) or B (2300), the data sharing from compartment B (2300) can be based on Compartment C's (2400) membership in the federation.

6.3.5.3 Back Propagation

In some embodiments, both nested and federated compartment arrangements include means for a compartment to acquire or share policy elements with other compartments, such as lists of mandatory applications. For example, if an enterprise has a workflow that involves using enterprise data, contained in an enterprise compartment, and portions of that enterprise data that is stored in a cloud storage system, such as DropBox, the workflow may require the policy of the enterprise compartment to permit applications in the enterprise compartment to access the DropBox compartment data and enable their access. This permission may take the form of policy elements that include access credentials, define specific applications such as client software, that operate using these access credentials, or other limitations on the compartment. In more specific embodiments, such means include enabling the enterprise policy distribution points to add the required applications and permissions to the enterprise compartment policy, it must be possible to determine what software is required, and what permissions and access are needed to operate it, and whether these are compatible with the enterprise compartment's policy. In still more specific embodiments, such means are provided using back propagation. These embodiments can be implemented by those having ordinary skill in the art using the disclosure and teachings herein.

In some embodiments, back propagation is used within a single compartment; in other embodiments, back propagation is used between compartments that are sharing policy elements (e.g. nested or federated compartments); and in still other embodiments, back propagation is used between a compartment and an external system, to arrange inclusion of policy elements in compartment policy to ensure that all workflow-required applications are included, and that both mandatory and optional applications can interact as needed so that workflows can function. These embodiments can be implemented by those having ordinary skill in the art using the disclosure and teachings herein.

By way of illustration and not limitation, if a workflow is analyzed or specified as requiring a given application or set of applications, for example the "DropBox application set", or the "SalesForce application set", and if there is a known method for querying DropBox, SalesForce, or some other system to obtain the required policy elements, the policy elements are included in the compartment policy for the compartments that support the workflow. For example, a query protocol that is well known to all providers of workflow applications, that can be used to request associated policy elements, and to transfer them to a compartment policy distribution point can be used. For example, HTTP can be used to request an XML file containing application and permissions requirements, or an e-mail message to an information request address can result in a response message with a list of applications and associated permission requirements. Compatibility with existing compartment policy is handled in the normal policy de-confliction processing done when merging policy elements to create a complete policy. An example of such a protocol can be an HTTP request naming a resource that specifies policy elements in XML, or a SOAP request that returns a list of applications and privileges in XML or other format that can then be processed into policy elements. This requires that providers of workflow applications cooperate in setting up servers in support of this method, that enterprises do so for the applications or application sets that their compartment workflows require, or that third party sources, such as "app stores" provide this support.

In other embodiments, compartment administrators are tasked to obtain the required workflow application information without cooperation from workflow application providers or others, and incorporate it into compartment policies. For example, acquiring information about required applications through human-manual means such as reading user manuals, and to then create policy elements accordingly, or by recording the application invocations and usage patterns of users of the workflow, such as by use of a test compartment that has no sensitive data and a very permissive policy, and creating policy elements that make the applications used mandatory and that enable the interactions that were seen to be used in the test run of the workflow. Once the required policy elements have been determined, policy distribution points can be used to distribute them for use by other policy distribution points that provide workflow-related policy elements to the respective compartments they serve. These embodiments can be implemented by those having ordinary skill in the art using the disclosure and teachings herein.

Figure 3:
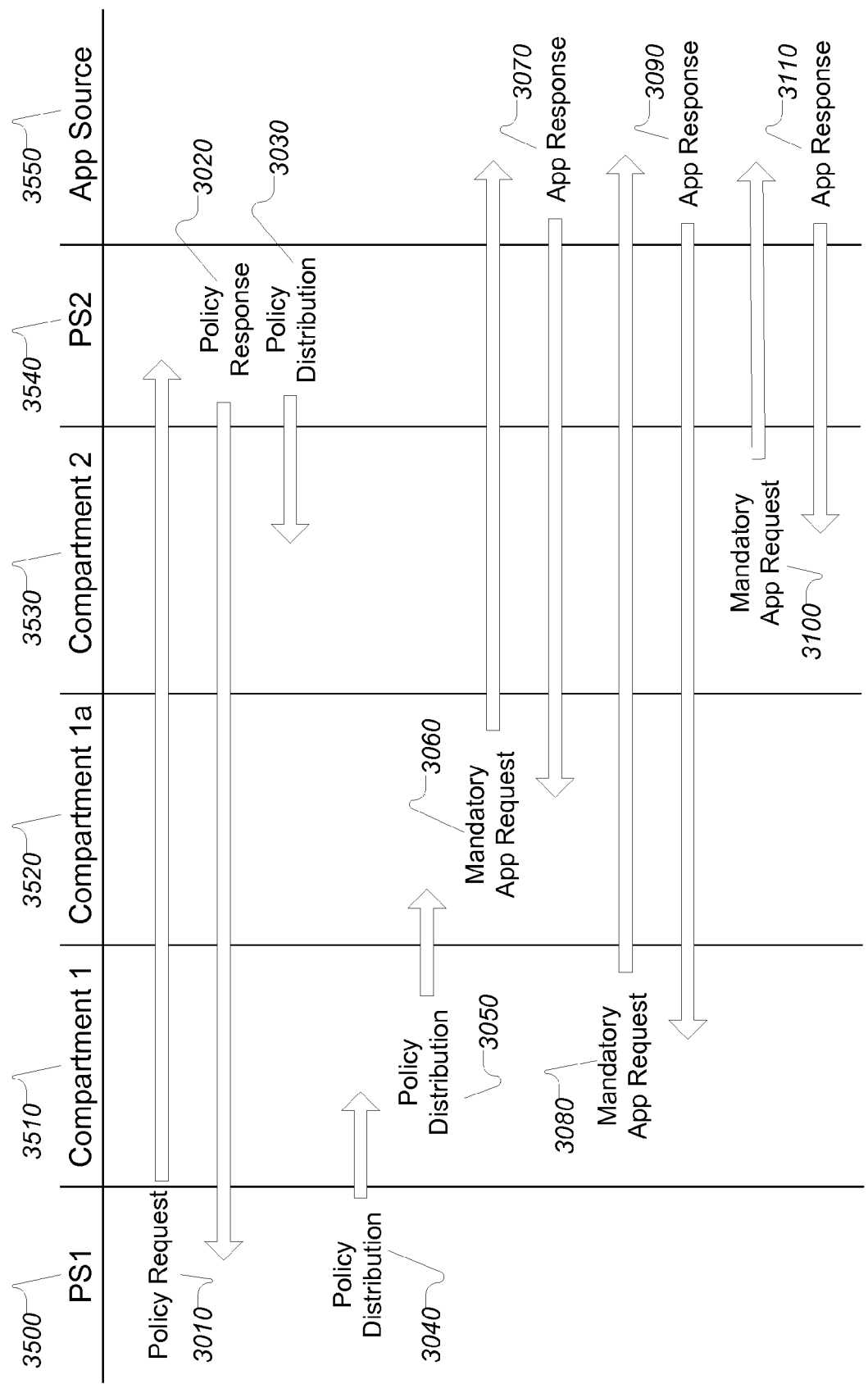
FIG. 3 is a diagram of exemplary message flows for back propagation in a nested compartment scenario.

FIG. 3 illustrates an example of back propagation interactions in a nested compartment arrangement when compartment 1 (3510) and 1a (3520) require access to compartment 2 (3530) for a cross-compartment workflow.

The policy distribution point for compartment 1 (3510), PS1 (3500), requests the needed policy elements (3010) from PS2 (3540), the policy distribution point for compartment 2 (3530). PS2 (3540) responds by sending the policy elements (3020) (provided that its policy permits this) to PS1 (3500). PS2 (3540) may require authentication, authorization, or other steps prior to providing the policy elements in some cases. PS2 (3540) may also update the policy (3030) for compartment 2 (3530) in anticipation of contact from compartment 1 (3510) to permit such contact to take place, if required. PS1 (3500) uses the provided policy elements to update the policy (3040) of compartment 1 (3510). Compartment 1 (3510) may use the updated policy to update the policy (3050) of its nested compartment, compartment 1a (3520), depending on the requirements of policy. In some cases compartment 1a (3520) may be prohibited from accessing compartment 2 (3530), even though compartment 1 (3510) is permitted to do so. In cases where both compartment 1 (3510) and 1a (3520) are permitted to access compartment 2 (3530), both implement the updated policy, such as by requesting the new mandatory applications (3060 & 3080) from an application source (3550), such as an "app store". and installing and/or instantiating the mandatory applications when they are returned by the application source (3070 & 3090). Compartment 2 (3530) may also have new mandatory applications as a result of its policy update, and will likewise request (3100), install and/or instantiate them to comply with the updated policy when they are made available (3110). As usual, if the updated policy prohibits existing applications, these will be dealt with as part of this process.

Figure 4:
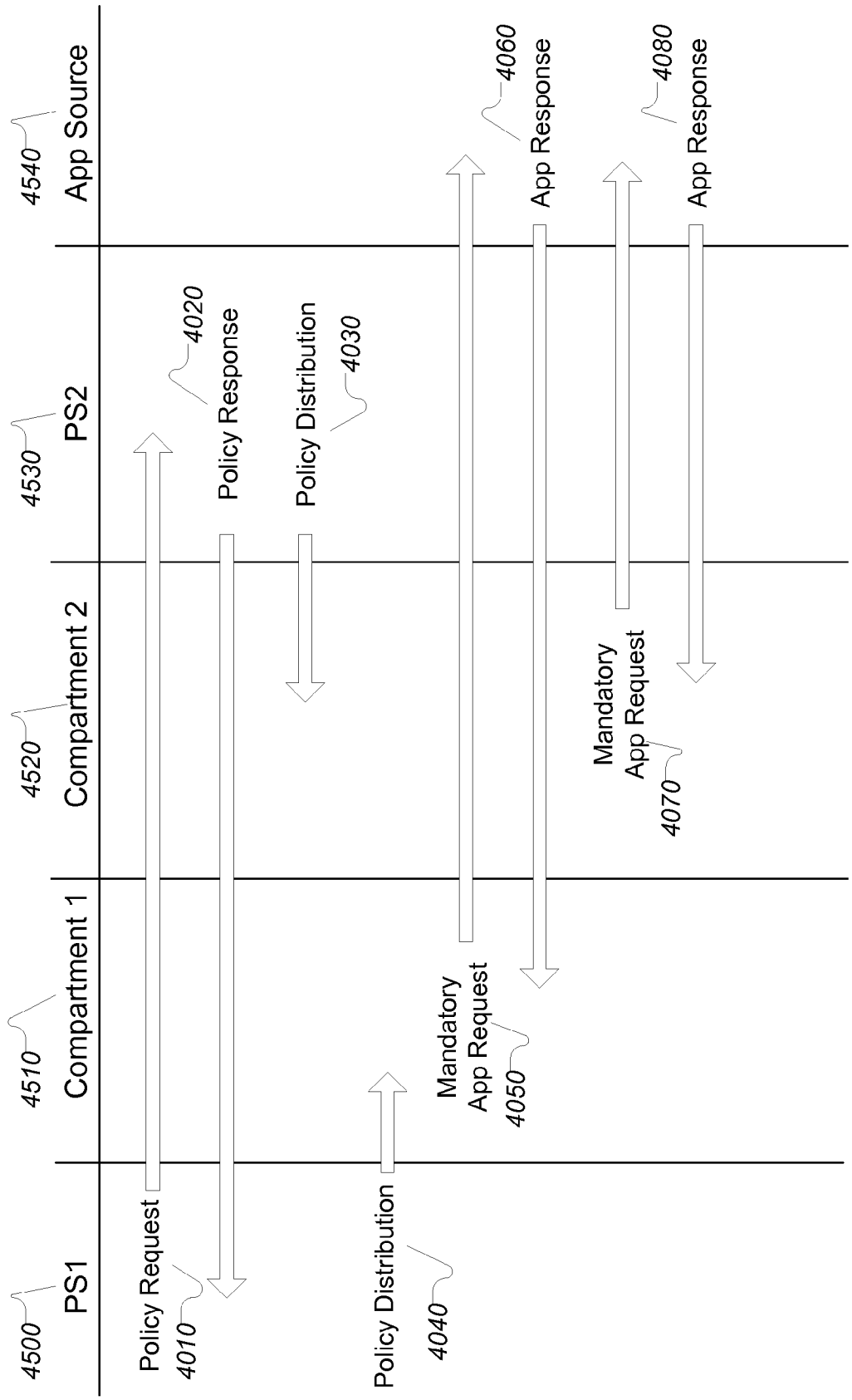
FIG. 4 is a diagram of exemplary message flows for back propagation in a federated compartment scenario.

FIG. 4 shows example for a federated compartment arrangement using a similar pattern of interactions as discussed above with regards to in the example illustrated in FIG. 3. Policy distribution point PS1 (4500), the policy distribution point for compartment 1 (4510), requests the needed policy elements (4010) from policy distribution point PS2 (4530), the policy distribution point for compartment 2 (4520). PS2 (4530) responds by sending the policy elements (4020) (provided that its policy permits this) to PS1 (4500). PS2 (4530) may require authentication, authorization, or other steps prior to providing the policy elements in some cases. PS2 (4530) may also update the policy for compartment 2 (4030) in anticipation of contact from compartment 1 (4510) to permit such contact to take place, if required. PS1 (4500) uses the provided policy elements to update the policy of compartment 1 (4040). Compartment 1 (4510) implements the updated policy, such as by requesting new mandatory applications (4050) from an application source (4540), such as an "app store". and installing and/or instantiating the mandatory applications when they are returned by the application source (4060). Compartment 2 (4520) may also have new mandatory applications as a result of its policy update (4030), and will likewise request (4070), install and/or instantiate them to comply with the updated policy when they are supplied (4080). If the updated policy prohibits existing applications, these will be dealt with as part of this process.

In both of the scenarios illustrated in FIGS. 3 and 3, PS2 (3540 or 4530) can be replaced by another source of policy elements, such as an aspect of policy distribution point PS1 (3500 or 4500) that interacts with compartment administrators to obtain policy elements, interacts using an appropriate protocol with a server that can provide the policy elements as described above, or by other means.

6.4 Illustrative Multi-Level Policy Distribution and Enforcement Arrangement

Figure 5:
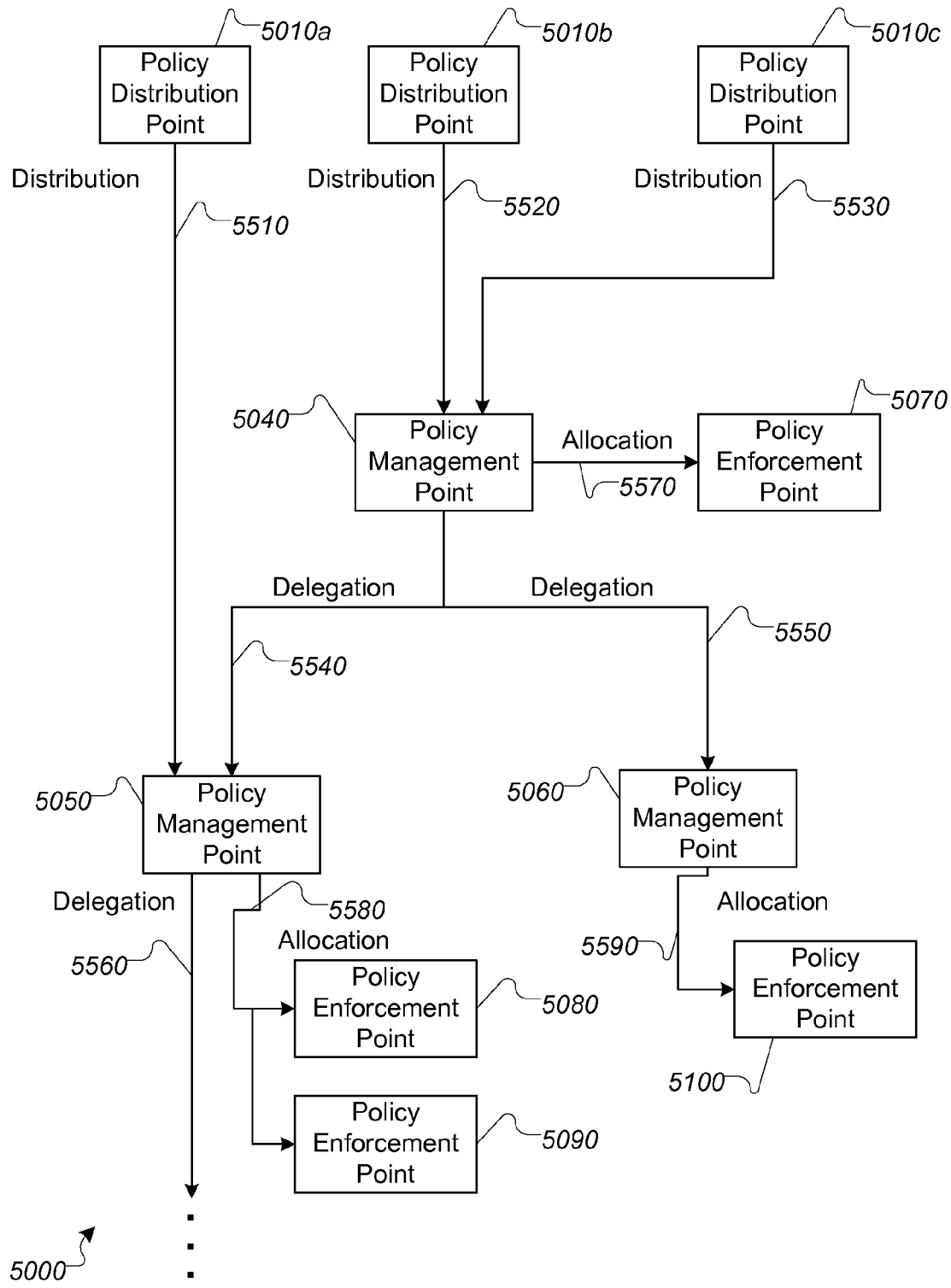
FIG. 5 is a schematic diagram of a multi-level policy distribution and enforcement arrangement, according to one embodiment of the invention.

FIG. 5 illustrates a schematic diagram of the major components of a multi-level policy distribution and enforcement arrangement in accordance with one embodiment of the invention (5000). The components and their connections can be implemented by those having ordinary skill in the art using the description and figures herein using network connected and stand-alone computing devices of ordinary manufacture.

In the illustrated exemplary embodiments, policy is distributed by one or more policy distribution points (5010a, 5010b, & 5010c). Distribution can be done by pushing out policy periodically, or as policy is created or altered, or distribution can be performed by periodic polling of policy distribution points by components requiring policy. Still other methods for distributing policy will be apparent to those having ordinary skill in the art.

In some embodiments, policy is distributed from policy distribution points to one or more policy management points (5040, 5050) that can federate policy from a plurality of policy distribution points. For example, policy management point 5040 federates policy distributed (5520 & 5530) from policy distribution points 5010b and 5010c. Any number of policy distribution points may be utilized by a policy management point, and any number of policy management points can be supported by a policy distribution point.

The policy management points either allocate one or more aspects of the federated policy to one or more policy enforcement points (5070, 5080, 5090, & 5100) or delegate one or more aspects of the federated policy to other policy management points (5050 or 5060), or both. For example, policy management point 5040 allocates (5570) policy enforcement for at least some of the policy elements it has received to a policy enforcement point (5070), and delegates (5540 & 5550) at least some of the policy elements it has received to policy management point 5050 and/or policy management point 5060. Policy management points 5050 and 5060 then allocate policy elements to their policy enforcement points (5080, 5090, & 5100) as required, or, as in the case of policy management point 5050, further delegate (5560) policy elements to yet other policy management points (not shown).

Policy elements can be selected for allocation on the basis of policy elements governing the actions of the policy management point, or alternatively, upon the basis of one or more of identification, attributes, characteristics, or capabilities of the policy enforcement point(s) that are to implement the specific policy elements. For example, a policy enforcement point may specify that it can implement file system or network connection policy elements, and the policy may specify (explicitly) that it requires a file system policy enforcement point. Alternatively, the policy management point can infer the requirements based upon known capabilities of the policy enforcement point and the type or types of the policy element or elements to be allocated.

Policy elements can be allocated by a policy management point to a single policy enforcement point, or to a plurality of policy enforcement points. For example, if both a first and a second file system policy enforcement point are available, the policy management point can allocate a policy element requiring a file system policy enforcement point exclusively to the first policy enforcement point, exclusively to the second policy enforcement point, or to both policy enforcement points. This permits the policy to be widely enforced without regard to the installed policy enforcement point.

In some cases, the policy element may name the policy enforcement point to use. This is particularly useful when a distributable policy enforcement point is required. In this case, the policy element indicates the particular policy enforcement point to use, or the type of policy enforcement point to use, and if the policy enforcement point is a distributable policy enforcement point, identify how to obtain the distributable policy enforcement point for subsequent use. In at least some cases, such identification is provided in the compartment policy, such as by specifying an application store to use for acquiring distributable policy enforcement points, or a URL of a policy enforcement point generator. In some embodiments, the distributable policy enforcement point can be downloaded prior to first use or downloaded on demand. In these cases, the policy management point ensures that the appropriate distributable policy enforcement point is available to the system prior to compartment use.

Allocation of policy elements involves the logical steps of comparing policy requirements to policy enforcement point capabilities and attributes and making the decision that one or more policy enforcement points are to be used to enforce a policy element (as shown in FIG. 5), and also includes the optional steps of making the policy element available to the policy enforcement point(s) to which it is allocated. In some embodiments, this involves making a copy of the policy element and communicating it to the policy enforcement point(s) to which it was allocated. In other embodiments, the making available step involves making a copy of the policy element accessible by the policy enforcement point(s) and providing the policy enforcement point(s) a reference to the accessible copy. In yet other embodiments, making the policy element available to the policy enforcement point(s) involves translating the policy element to a form usable by the policy enforcement point(s). In still other embodiments, making the policy element available to the policy enforcement point(s) involves configuring the policy enforcement point(s) using an API provided for the purpose of configuring the policy enforcement point(s).

Policy elements can be selected for delegation on the basis of policy elements governing the actions of the policy management point, or alternatively, upon the basis of one or more of identification, attributes, characteristics, or capabilities of the policy management point(s) that are to be delegated the specific policy elements. For example, a policy element may specify that it can be delegated, and a policy management point may specify that it has policy enforcement points available to implement file system or network connection policy elements, and the policy may specify (explicitly) that it requires a file system policy enforcement point. Alternatively, the policy management point can infer the requirements based upon known capabilities of the policy management point and the type or types of the policy element or elements to be delegated. In yet other cases a policy management point can be implemented so as to delegate all policy elements marked as delegatable.

Policy elements can be delegated by a policy management point to a single policy management point, or to a plurality of policy management points. For example, if both a first and a second policy management point are available, the delegating policy management point can allocate all policy elements exclusively to the first policy management point, exclusively to the second policy management point, allocate all policy elements to both the first and second policy management points, or allocate a subset of the policy elements to the first policy management point and the remainder to the second policy management point.

In some cases, the policy element may name the policy management point to delegate to. Such naming can be to a specific policy management point, to a set of policy management points, or be specified using other factors, such as the type of device hosting the policy management point, the specific device hosting the policy management point, the compartmented applications permitted on a particular device, or the capabilities of the device hosting the compartment (e.g. i-Fi, Bluetooth, removable storage, policy enforcement point generator, etc.).

Delegation of policy elements involves the logical steps of comparing policy requirements to policy management point capabilities and attributes and making the decision that one or more policy management points are to be used to allocate or further delegate a policy element (as shown in FIG. 5), and also includes the optional steps of making the policy element available to the policy management point(s) to which it is delegated. In some embodiments, this involves making a copy of the policy element and communicating it to the policy management point(s) to which it was delegated. In other embodiments, the making available step involves making a copy of the policy element accessible by the policy management point(s) and providing the policy management point(s) a reference to the accessible copy. In yet other embodiments, making the policy element available to the policy management point(s) involves translating the policy element to a form usable by the policy management point(s). In still other embodiments, making the policy element available to the policy management point(s) involves configuring the policy management point(s) using an API provided for the purpose of configuring the policy management point(s).

In some embodiments, policy management points also aggregate policy from a policy distribution point, with policy that is delegated from another policy management point. For example, policy management point 5050 aggregates policy distributed (5510) from policy distribution point 5010a with policy delegated (5540) by policy management point 5040. The aggregated policy, regardless of the source it was received from, is then de-conflicted and delegated (5560) to other policy management points (not shown) or allocated (5580) to policy enforcement points (5080, 5090). In some cases aggregation is not required, for example in the case of policy management point 5060, which receives only delegated (5550) policy from policy management point 5040. Policy management point 5060 also demonstrates that further delegation of policy is not required in all cases as it only allocates policy to policy enforcement point 5100.

It is possible that aggregation or conflict resolution of policy (or both) can result in errors that cannot be dealt with by policy management points. For example, two policy distribution points can provide mutually exclusive policy elements where the conflict cannot be resolved using the methods employed by policy management points for policy conflict resolution; a policy can require additional policy elements from another policy distribution point that cannot be reached; or a policy distribution point can specify policy elements for a device that cannot be enforced on that device. In such cases, the policy management point employs an error handler to resolve the problem. Resolution can involve disabling all use of a compartment until the policy issues are resolved by a change in policy, notification of the source of the problematic policy elements (e.g. a policy server, the policy management point that delegated the problematic policy elements, etc.), execution of a policy-specified action (e.g., display a message for the device user, send e-mail or SMS messages to specified addresses, etc.), or other methods as determined to be proper by those with skill in the art. Combinations of any or all of these methods can also be employed using techniques familiar to those having ordinary skill in the art.

Returning FIG. 5, in some embodiments Policy enforcement points (5070, 5080, 5090, & 5100) enforce the policy they are allocated using various methods, such as by configuring device policy settings, setting virtual machine operating parameters, or encapsulating applications to enable moderation of their access to resources. In more specific examples of such embodiments, policy enforcement points (5070, 5080, 5090, & 5100) are implemented in one or more forms depending on implementation design preferences or requirements. For example, in an exemplary embodiment, a single exemplary policy enforcement point implementation can enforce policy using all available methods, such as device policy settings, operating system controls, virtual machine operating parameters, and application encapsulation. Policy enforcement points may be installed as part of a device operating system, as part of a virtual machine's hypervisor, in a loadable module such as a DLL or shared library, as part of an application interpreter such as a Java Virtual Machine, as part of a program loader, or in other ways as will be apparent to those with skill in the art. Still other arrangements will be understood by those having ordinary skill in the art.

Instances of this single exemplary policy enforcement point implementation can be deployed wherever a policy enforcement point is required. In an alternative exemplary embodiment, a plurality of policy enforcement point types can be implemented, each specialized for a sub-set of policy enforcement point methods. The plurality of policy enforcement points may be utilized together to cooperatively enforce the policy, and can be intermixed in order to provide the most effective protections for the compartment. For example, device policy and virtual machine operating parameter enforcement methods can be implemented in a first policy enforcement point design, while a second policy enforcement point design can implement application encapsulation, and each type is then deployed according to its capabilities and the requirements of policy enforcement. In yet another alternative exemplary implementation, both methods can be employed, where a first type of policy enforcement point capable of using all methods of policy enforcement are implemented along with other, more specialized, policy enforcement point types that each use only a subset of enforcement methods, and each type of policy enforcement point is instantiated according to policy requirements. For example, on devices where a plurality of policy enforcement point instances would be impossible or inefficient due to device or OS design, the first type of policy enforcement point can be instantiated, while on devices where a plurality of policy enforcement point instances is not problematic and only a subset of enforcement methods are required by policy, an appropriate selection of more specialized policy enforcement point types can be instantiated. The decision as to how to instantiate policy enforcement points can be specified in policy, or left for policy management points to determine based on such things as device capability, device status, or the requirements of policy. In such cases the decision as to how to instantiate policy enforcement points can be revised when policy, device status, or other factors change. These points will be familiar to those having ordinary skill in the art.

In some implementations, policy enforcement is allocated in a distributed manner. For example, a policy specifies that all communications from a device be performed to a specified endpoint using encrypted communications. The policy elements making up this specification may be allocated to a VPN endpoint and router policy enforcement point at a corporate site, and to a specific compartment's policy management point on a mobile device, which allocates policy elements to one or more policy enforcement points in the compartment. In this way, the applications that are part of the compartment on the mobile device have their communication to the VPN endpoint enforced by a policy enforcement point or points on the mobile device, while the traffic management and routing of the traffic at the VPN endpoint is handled in accordance with the elements of the policy allocated to the VPN endpoint and router policy management point.

In still other implementations, one or more elements of a policy are allocated to a specific distributable policy enforcement point, where the policy enforcement point is subsequently distributed to a device and implements at least part of the policy enforcement for a compartment.

Policy conflict resolution, allocation, and selective distribution can take place at any policy management point, so there is no need for device configuration to be known by a policy distribution point, and enforcement is done in the most efficient manner possible.

As will be appreciated by those having ordinary skill in the art, by separating policy management and policy enforcement, and implementing both in a multi-tiered arrangement as described herein, great flexibility is achieved. For example, policy enforcement points can be implemented by manufacturers of devices or OSs, and employed by policy management points provided by a third party security provider. Policy management points can allocate policy enforcement in different ways on different devices, so as to make best use of the resources available on each device, or to cope with different limitations on different devices, without requiring policy to be specified for each device at the policy distribution point(s), or requiring the policy administrator(s) to know the specifics of how policy will be enforced on each device. Furthermore, distributable policy enforcement points can be configured and downloaded to a device on an as-needed basis.

Figure 6:
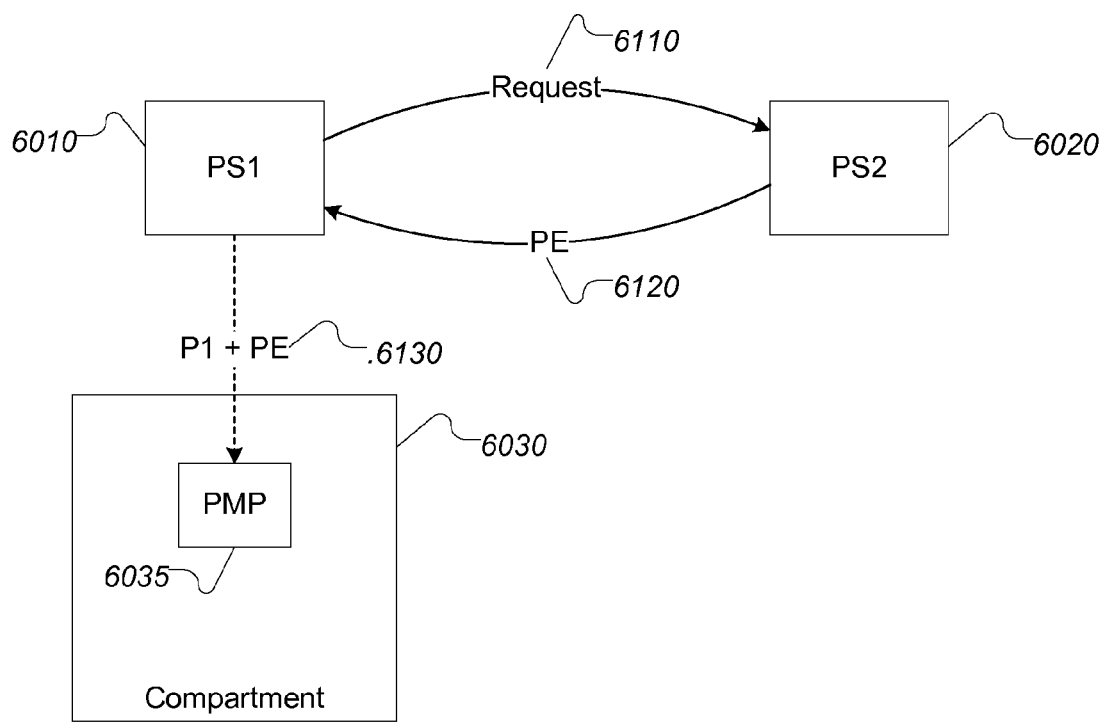
FIG. 6 is a diagram showing a master policy distribution point that pre-integrates subsidiary policy elements before delivery of policy to a policy management point.

The policy elements can be obtained from other policy sources, such as policy servers, web sites, administrator inputs, or other servers configured to supply policy elements. For example, FIG. 6 shows policy distribution point PS1 (6010) requesting one or more policy elements from policy distribution point PS2 (6110), and PS2 (6020) supplying the requested policy element(s) to PS1 (6120).13120). PS1 (6010) then combines the requested policy elements with any other compartment policy elements (6030), and distributes the resulting policy (6130) to a compartment policy management point (6035) for implementation and enforcement. Implementation of such details will be apparent to those having ordinary skill in the art.

Figure 7:
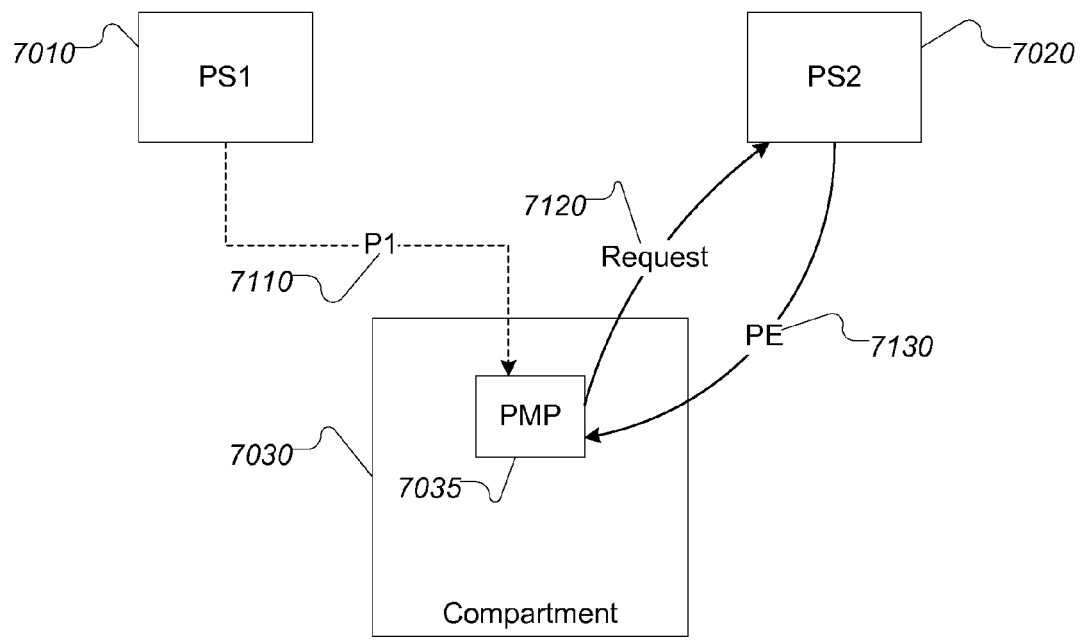
FIG. 7 is a diagram showing a master policy distribution point that distributes policy, with subsidiary policy being integrated by a policy management point.

FIG. 7 shows an alternate method for a policy management point in a compartment to obtain policy. In this example, policy distribution point PS1 (7010) has supplied compartment policy (7110) to the policy management point (7035) of the compartment (7030) that permits acquiring policy elements from policy distribution point PS2 (7020). The policy management point (7035) requests the policy elements from PS2 (7120), and PS2 supplies the policy elements (7130), and the policy management point (7035) aggregates and de-conflicts the PS2-supplied policy elements with the PS1-supplied policy elements to form the complete compartment policy. Note that PS2 (7020) can be replaced with any source of policy elements, such as a web server, a file on an FTP site, etc. using any method or protocol deemed appropriate as will be understood by those with skill in the art. Policy elements acquired from PS2 (7020) will be aggregated with the compartment policy supplied by PS1 (7010) as usual, with any policy elements from PS2 (7020) that violate compartment policy as supplied by PS1 (7010) being ignored, causing all of the policy elements from PS2 (7020) to be rejected, or handled otherwise as specified by the PS1-supplied compartment policy (7110) or the system design as implemented. Implementation of such details will be apparent to those having ordinary skill in the art.

Figure 8:
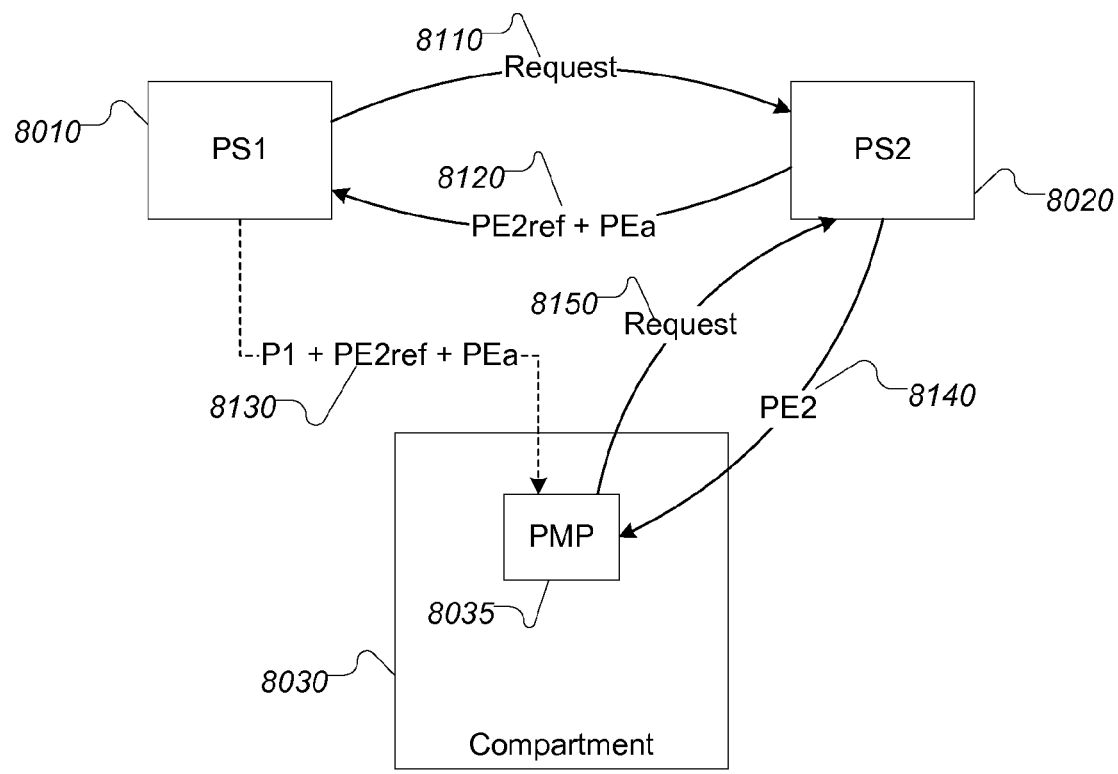
FIG. 8 is a diagram showing a master policy distribution point that pre-integrates references to a subsidiary policy with an authenticator, then distributes to a policy management point for integration.

FIG. 8 illustrates yet another alternate method for a policy management point in a compartment to obtain policy, where policy distribution point PS1 (8010) requests policy elements (8110) from policy distribution point PS2 (8020) and receives a reference, PE2ref, (8120) that can be used to acquire PS2's (8020) policy elements. Included along with PE2ref is an authenticator policy element, PEa (8120). The PEa authenticator can be used to authenticate the PS2 policy elements when they are acquired, and can consist of anything useful for this purpose, such as a copy of the PE2 elements, a checksum, a decryption key, or a function to execute. Once PS1 (8010) has vetted the PE2ref, PS1 (8010) combines the PE2ref and the PEa authenticator from PS2, optionally with additional policy elements of the compartment policy, and distributes them (8130) to a policy management point (8035) of the compartment (8030). The resulting policy permits and enables the policy management point (8035) to request policy elements (8150) from PS2 (8020) and to authenticate the policy elements returned (8140) from the request using the authenticator PEa. An example use case for this method can involve a network service that requires local client software, such as DropBox. The PS1 request for policy elements (8110) can return a PE2ref (8120) useful to request policy elements (8150) that specify the DropBox client application as a mandatory application, and/or general use policy elements, such as network addresses and access permissions for them, and permission for PS2 (8020) to supply additional policy elements directly (8140). Additional policy elements from PS2 (8140) can be used to control access to specific aspects of the service, such as file permissions or account restrictions. By supplying a reference (PE2ref), rather than the PE2 elements themselves (8140), PS2 (8020) retains control over its policy elements until they are requested by a policy management point of a compartment (8150). Including policy elements that permit PS2 (8020) to supply additional policy elements to the compartment (8030) enable PS2 (8020) to adjust its policy elements as needed to accommodate changes in the service or the client applications. Compartment policy elements (8130) can be used to limit PS2 policy elements (8140) to those permitted by the compartment (8030) policy, for example by using the policy de-confliction mechanism. Implementation of such details will be apparent to those having ordinary skill in the art.

These examples illustrated in FIGS. 6-8 were described with respect to a single compartment; but they can be implemented and are useful when a plurality of compartments are involved, where the policy elements that permit them to interact create relationships between the compartments that can be referenced in policy elements to enable useful structures to be formed. For example, compartments can be "nested", with policy potentially delegated from outer containing compartments to inner nested compartments. Compartments might also be formed into federated groups that recognize other compartments as members of the federated group and have different policies with respect to them than they do to non-federated group compartments. Federations of nested compartments are also possible. Such relationships permit modeling of organizational structures such as enterprise-department-work group, with policy that is defined at each organization level enforced by an appropriate compartment nesting level or through federated group memberships. As will be understood by those having ordinary skill in the art, this enables multi-level administration of policy.

6.4.1 Policy

In another aspect, the present invention provides compartment policies that define aspects of compartment structure, behavior, and relationships to other compartments and to non-compartmented entities. In some embodiments, the types of information required to implement these requirements include:

Access Control—Specify access to compartment resources (applications, information, device hardware or other capabilities (e.g., timers, inter-process communication, shared memory, file systems, etc.) by compartment components or extra-compartment entities for reading, writing, modifying, appending, creating, or deleting.

Relationships—Specify policy distribution points, nested or federated compartment relationships with other compartments, and the information required to participate in these relationships.

Compartment Data—Pre-loaded information useful to compartment components, such as the compartment ID, initial compartment policy elements, signing keys and authentication certificates.

Applications—Permitted, Required, and Prohibited applications for the compartment.

Archive Requirements—Synchronization and Backup requirements for the compartment. What is synchronized or backed up, when this is done (e.g., at compartment instantiation, compartment destruction, periodically and when, upon change and what changes are used as triggers, etc).

Protections—at-rest, in-motion, and in-use protection requirements for compartment information (e.g., encrypted storage, specific file system requirements, OS protection level default/minimum/maximum, network protocol use, data tagging requirements, etc).

Policy Handling—conflict resolution method(s) to use, policy allocation preferences or requirements.

In addition, policy elements can be conditional, with their activation being dependent on a variety of factors, including but not limited to:

Hosting device location—current geographic location as determined by GPS, cellular triangulation, or other method as determined by device capabilities.

Time—time of day, specified time range, date or date range, time since an event, time until an event.

Device Type—tablet/phone/other, device model, device manufacturer, device OS type and/or version, etc.

Specific Device—as determined by a serial number, IMEI number, or other unique ID.

Connectivity—how device can, or is, currently connected to other systems or devices (e.g. via VPN, public internet, Wi-Fi, Bluetooth, IrDA, etc.)

In some more specific embodiments, policy is specified, stored, delivered, processed, and implemented in different formats as determined to be proper by those with skill in the art. For example, policy may be specified using a graphical user interface, a specified written syntax, or by voice input in natural language; stored in database records, using a specified syntax in a flat text file, or as records in an ISAM file; delivered as an XML document over an HTTP connection or transferred as a flat text file using a file transfer protocol such as FTP; processed as a set of in-memory data structures or a set of trigger/action rules; and allocated for implementation as a set of rules for a rule-processing engine. Any representation capable of incorporating the required policy element information in a form that can be acted upon by compartment components so as to implement the required compartment policy can be used.

6.4.2 Policy Management Point

Figure 9:
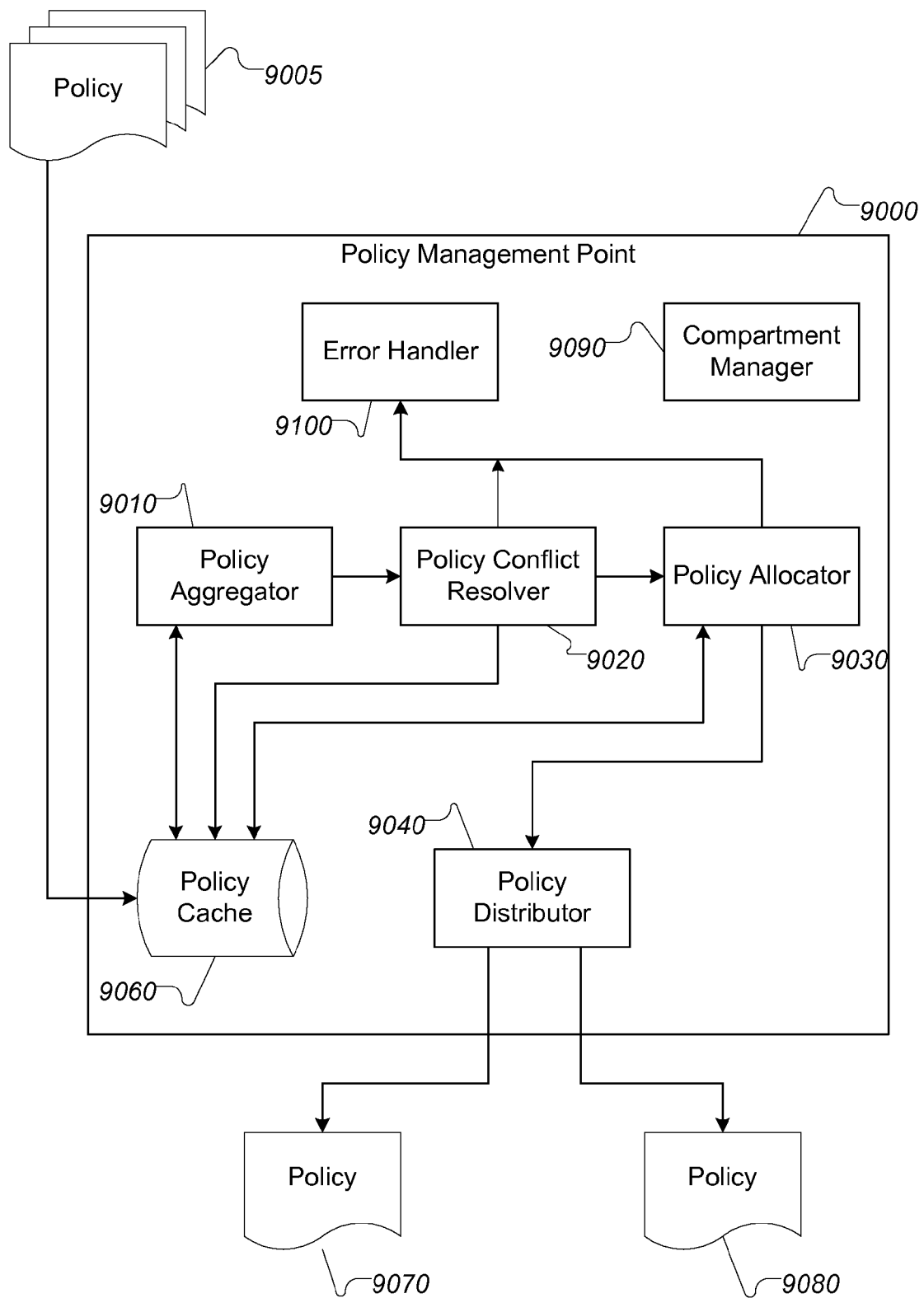
FIG. 9 is a schematic diagram of a policy management point, according to one embodiment of the invention.

FIG. 9 illustrates one example of a policy management point in accordance with the invention (9000) and some related inputs and outputs. The policy management point embodiment illustrated include includes policy aggregator (9010), policy conflict resolver (9020), policy allocator (9030), policy distributor (9040), compartment manager (9090), error handler (9100), and policy cache (9060). As will be appreciated by those having ordinary skill in the art, the functionalities of the illustrated components can be divided or merged to make other embodiments without affecting the functionality of the policy management point. The elements and their connections can be implemented by those having ordinary skill in the art using the description and figures herein In some embodiments, a policy management point supports the following functions:

Receipt of policy from policy distribution points (using either pull or push transmission), Local storage of received policies, preferably in non-volatile storage, Translation of received policies to local formats (optional, as required)

Aggregation and de-confliction of received policies,

Allocation of aspects of the resulting de-conflicted policies to one or more policy enforcement points, Delegation of other aspects of the resulting de-conflicted policies to other, subsidiary policy enforcement points (where they are subsequently managed), Translation of allocated and delegated policies for distribution (optional, as required)

Distribution of allocated and delegated policy to policy management points and policy enforcement points, and All necessary communications and error handling required to accomplish the above steps.

Continuing with FIG. 9, policy or policies (9005) received by the policy management point (9000) are stored in a policy cache (9060) and then aggregated by the policy aggregator (9010). Any conflicts between aggregated policy elements are resolved by the policy conflict resolver (9020) using any of the methods described herein or known to those with skill in the art. The resulting aggregated and de-conflicted ("unified") policy is then saved in a policy cache (9060) for future use, thus avoiding the need for subsequent interaction with the component(s) that supplied the policies to the policy management point, or re-aggregation and conflict resolution, until and unless there are policy changes.

Each unified policy also can be delegated, in whole or in part, to other policy management points or allocated to policy enforcement points by the policy allocator (9030). Policy allocation includes determining which aspects of a policy will be implemented by specific policy enforcement points or which aspects of the policy will be delegated to other policy management points, or both. In some embodiments, the allocation is encoded within the unified policy. In other embodiments, the unified policy is broken up into one or more policy elements, which are independently distributed as described below. Those policy elements that have been allocated for distribution to policy enforcement points (9070) are distributed by the policy distributor (9040) to those policy enforcement points. Those policy elements that have been delegated to other policy management points (9080) are also transferred to those other policy management points by the policy distributor (9040).

In some embodiments, the policy allocator also uses the policy cache to save policies as distributed to policy enforcement points, or delegated to policy management points. As will be appreciated by those having ordinary skill in the art, saving copies of the distributed or delegated policy elements enables the policy management point to respond to requests for policy from the policy enforcement points or policy management points without having to perform the allocation again. Reducing computation in this way reduces battery drain in mobile devices.

In some exemplary implementations, policy is supplied by policy distribution points in a variety of formats. To maintain efficiency, these must be translated into a common policy format for use by policy management points and policy enforcement points. Translation can be done by any policy management point, but is preferably done at the first policy management point that aggregates such policy. Doing translation at the first policy management point that aggregates policy that requires translation is necessary to permit that policy management point to aggregate, resolve conflicts, and to allocate policy to policy enforcement points or to delegate policy to other policy management points. As will be appreciated by those having ordinary skill in the art, without translating policy into a common format, determining that two policy elements are in conflict is problematic, as is determining which policy enforcement point is best able to enforce the policy elements, or which policy management point the policy elements should be delegated to. Policy translation from a generic format into a device-specific format is known, but the present invention is unique is providing translation from a variety of policy specification formats into a common format so that policy from disparate sources can be aggregated, conflicts resolved, and allocated to policy enforcement points.

In some embodiments, policy is also refined by policy management points to convert more generic policy elements into more device-specific policy elements. For example, consider the case in which a policy distributed by a policy distribution point requires that the contents of the compartment common storage are be protected against unauthorized reads. On a first device, the policy management point for the compartment refines this into policy elements that require the compartment common storage area be kept in an encrypted file system, while on a second device, that doesn't support encrypted file systems, the policy management point for the compartment refines the policy elements requiring protection against unauthorized reads into policy elements requiring that file access controls, such as access control lists, in the compartment common storage area not specify read access to applications that are not in the compartment. In some cases a dynamic policy enforcement point can be acquired and installed to allocate policy elements to, when existing policy enforcement points are not capable of enforcing all required policy elements. For example, in the second device case, a dynamic policy enforcement point capable of managing an encrypted file system could be instantiated on the second device, and the policy elements allocated to it. Policy management point refinement of policy enables policy administrators to specify policy requirements in a generic way, and have them implemented on a variety of device types with differing capabilities, without the policy administrators having to deal with individual device differences. Policy refinement can take place at any or all levels in the policy hierarchy.

With continuing reference to FIG. 9, if a policy conflict is found that cannot be resolved by the policy conflict resolver (9020), the error handler (9100) is notified. The error handler (9100) disposes of the un-resolvable conflict as previously described. The specific method used is an implementation decision that will be familiar to those having ordinary skill in the art.

In one embodiment, the policy cache (9060) maintains the current policy elements that have been delivered or delegated to the policy management point (9000) for use when policy distribution points are not reachable, as well as to improve efficiency when working with the current policy. In more specific embodiments, the current policy is saved in the policy cache (9060) by the policy conflict resolver (9020) once the policy has been aggregated and any conflicts resolved. In still more specific embodiments, the policy cache also maintains copies of the individual policies received from each policy distribution point; these are saved in the policy cache (9060) by the policy aggregator (9010) prior to aggregation, or saved in the policy cache upon receipt and prior to their being given to the policy aggregator (9010), depending on the design of the policy management point (9000). Cached individual pre-aggregation policies are useful when a first policy distribution point updates its policy elements and these must be re-aggregated and conflicts resolved with unchanged policy elements from a second, third, etc. policy distribution point. Without cached copies of the second, third, etc. policy elements, these would have to be requested from the policy distribution point, which would incur delay, and potentially expense if there are data charges for wireless data transmission based on usage.

In addition to managing policy for compartments, in some embodiments, the policy management points (9000) also are responsible for compartment management (9090), such as requesting, instantiating, or removing policy enforcement points, removing a compartment from a device, or managing compartment shared storage.

Those having ordinary skill in the art will appreciate that the above-described approach allows a policy management point to be implemented on a single device, distributed to a plurality of associated devices, or distributed more broadly across a plurality of devices related solely by distributed policies and the compartments defined by them. The present invention also permits the use of distributed policy enforcement, both linearly along the path of the policy from its source (the first policy distribution point) to a device where the policy is enforced on an end user device, and hierarchically, where policy is managed at a number of levels, such as in a server-based policy management point that allocates policy to server-based policy enforcement points as well as delegating policy to compartment policy management points on various devices, which allocate policy to various policy enforcement points and/or delegate policy to policy management points in a virtual machine, etc. In one particular implementation, the system permits the allocation of policy to one or more distributable policy enforcement point generators for the creation of dynamically created policy enforcement points.

6.4.3 Policy Enforcement Point (PEP)

Figure 10:
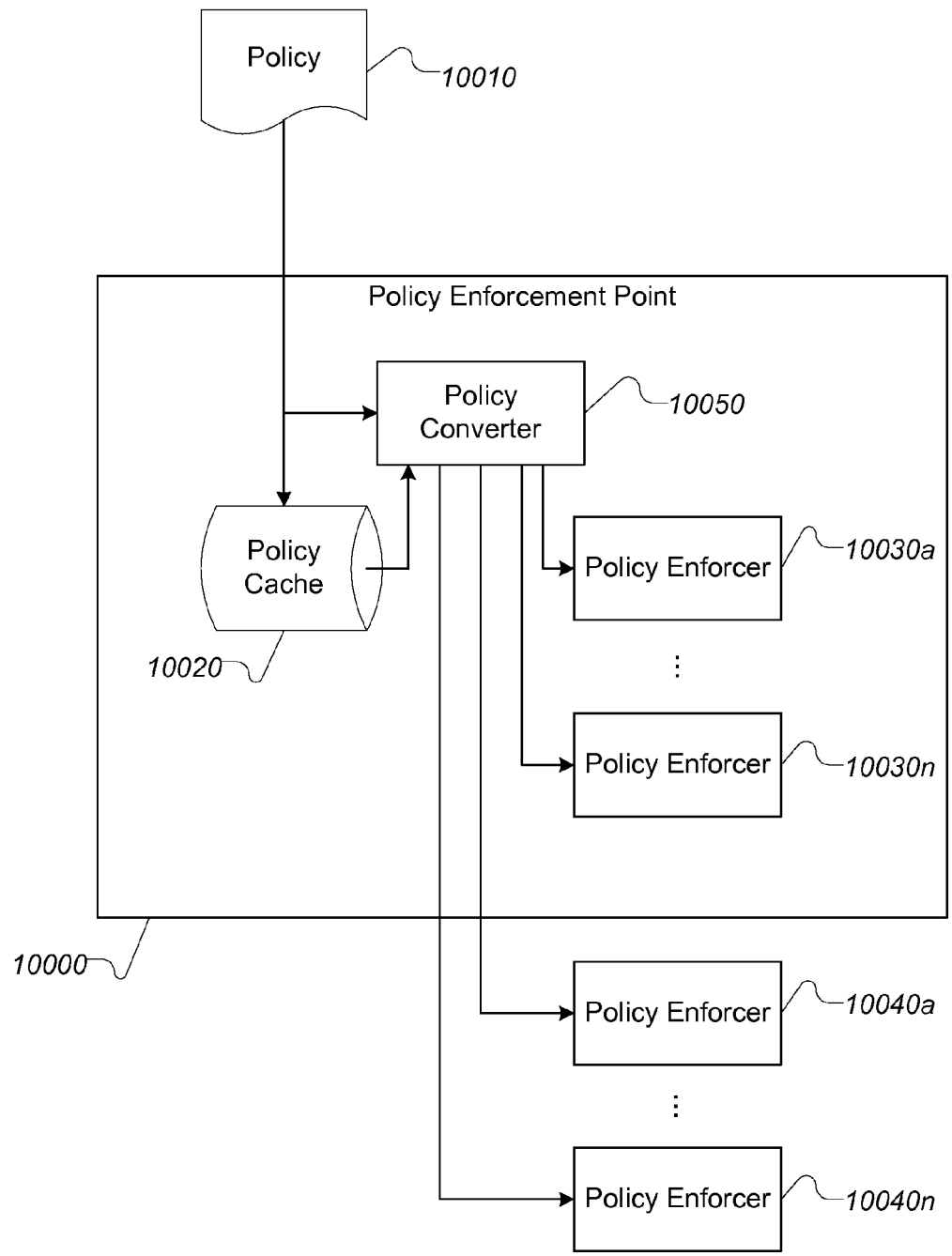
FIG. 10 is a schematic diagram of a policy enforcement point, according to one embodiment of the invention.

A policy enforcement point is responsible for enforcing the policy allocated to it. FIG. 10 illustrates a policy enforcement point in accordance with one embodiment of the invention (10000). The components shown are a policy cache (10020) and one or more policy enforcers (10030*a*-10030*n* & 10040*a*-

10040n) and a policy converter (10050). In various implementations, however, the functionality carried out by these components can be divided or merged into substantially equivalent arrangements as will be understood by those having ordinary skill in the art. The components and their connections can be implemented by those having ordinary skill in the art using the description and figures herein.

The policy cache (10020) stores policy (10010) that has been allocated and distributed to the policy enforcement point (10000) to reduce the need to re-supply the policy enforcement point with policy (10010), for example, after a device reboot. Policy enforcers (10030a-10030n & 10040a-10040n) carry out actions required to implement the policy (10010) allocated to the policy enforcement point (10000). A policy enforcement point can comprise one, or a plurality of policy enforcers (10030a-10030n) that are part of the policy enforcement point (10000), such as, for example and not limitation, an information filter that suppresses sharing of particular fields of records being transferred to another process, or policy enforcers can be separate from a policy enforcement point (10040a-10040n), such as an aspect of an operating system, file system, firewall, or other aspect of a device useful for enforcing at least one policy element. A policy enforcement point can employ one, or a plurality, of the policy enforcers of either or both kinds, depending upon the policy allocated to it. Policy enforcers can be employed separately to enforce different aspects of policy allocated to the policy enforcement point, or they can be employed cooperatively to enforce the same aspect of the policy allocated to the policy enforcement point, or both.

A policy converter (10050) translates policy elements into commands, options, configurations, or other required controls for the policy enforcers (10030a-10030n & 10040a-10040n) used to enforce the policy (10010) allocated to the policy enforcement point (10000). For example, if policy requires that a particular file in a common storage area be read-only (i.e. not writeable), a file system policy enforcement point can be allocated the relevant policy element(s). The policy converter of the policy enforcement point translates the policy element(s) into file system access control settings for the file and issues the required commands or function calls to set the file access control to those settings so as to enforce the policy.

In some embodiments, each policy enforcer carries out actions with respect to a particular type of device component. For example, a first policy enforcer carries out actions with respect to an operating system so as to cause that operating system to behave in a manner that enforces the policy that the policy enforcement point that comprises the first policy enforcer is responsible for enforcing, while a second policy enforcer can carry out actions with respect to a virtual machine (VM) so that the VM behaves in a manner that enforces the policy that the policy enforcement point that comprises the first policy enforcer is responsible for enforcing, while a third policy enforcer can carry out actions with respect to a software application that is running on the VM or under the OS so that the application is made to behave in a manner that enforces the policy that the policy enforcement point that comprises the first policy enforcer is responsible for enforcing. Each type of policy enforcer, optionally in conjunction with other aspects of a policy enforcement point (10000), is capable of translating policy elements into actions suitable for causing the type of device component it is designed to affect to behave in a manner that enforces policy (10010).

In some embodiments, policy enforcement points operate in "user mode" on the device while still providing compartment controls. For example, a policy enforcement point may operate in user mode using user-mode callbacks from an operating system equipped to provide these callbacks. Alternatively, a policy enforcement point may operate as a "wrapper" around an application, intercepting and mediating application requests to the underlying operating system. There is thus no need to modify the operating system or applications, install device drivers, or have privileged access (e.g. to root the device or have access as an administrator) in order to install the present invention on a device.

6.4.3.1 Policy Enforcement Point Types

In some exemplary embodiments policy enforcement points include a plurality of types. Non-limiting examples of policy enforcement point types are shown in Table 1. In such exemplary embodiments, policy enforcement point types differ from each other primarily in the capabilities of the policy converter to convert different policy requirements into commands, options, configurations, etc. for policy enforcers, and in which policy enforcers the policy enforcement point comprises.

TABLE 1

Exemplary types of policy enforcement points:

| Policy enforcement point type | Description |
| --- | --- |
| File I/O | Provides policy enforcement of file system operations, including create, open, read, write, and delete. |
| IPC | Provides policy enforcement of inter-process communications (e.g., messaging, shared memory) |
| Networking | Provides policy enforcement of network requests, including open, read, and write. |
| Firewall | Provides connection endpoint policy enforcement |
| Domain Import-Export Policy Enforcement Point (DIEPEP) | Provides policy enforcement of inter-compartment and extra-compartment information sharing |
| Application | Provides policy enforcement for an application, such as by encapsulating the application for use in a particular compartment. |
| Composite | A policy enforcement point comprising one or more policy enforcement point types. |

Composite policy enforcement points combine the features of one or more policy enforcement point types, such as the other types described in Table 1.

Dynamic policy enforcement points are policy enforcement points that are instantiated when and as needed, such as at invocation of an application in a compartment, and do not have a persistent instantiation on a device. They typically exit when the purpose for which they were invoked ends, such as when an encapsulated application exits. Dynamic policy enforcement points may be of any policy enforcement point type. Dynamic policy enforcement points are typically implemented for use in a specific compartment. Application policy enforcement points are typically implemented as dynamic policy enforcement points.

Static policy enforcement points are policy enforcement points that are instantiated at device boot time, when a compartment is created on a device, or at other such times, when there may or may not be any policy that needs enforcement immediately, and they have a persistent existence on a device that doesn't end until the device is shut down, the compartment is removed from the device, etc. Static policy enforcement points may be of any policy enforcement point type. Static policy enforcement points are typically implemented for use in a specific compartment, but in some exemplary embodiments they can be used to enforce policy for a plurality of compartments. Networking, Firewall, and File I/O policy enforcement points are typically implemented as static policy enforcement points.

A combination policy enforcement point combines aspects of a policy management point with a policy enforcement point. Combination policy enforcement points are especially advantageous when policy requires only a limited number of policy enforcement points on a device.

6.4.4 Policy Distribution Point (PDP)

In some embodiments, policy distribution points provide the distribution of policy, either in the form of complete policy, discrete policy elements, or sets of policy elements. Policy distribution points may be implemented as stand-alone policy servers, policy proxies, directory services, web servers, RSS feeds, file servers or other mechanisms that support the provision of policy to one or more policy management points using push methods, pull methods, or both. Compartments can be specified using policies from one or more policy distribution points. Policies from a plurality of policy distribution points can be aggregated by policy management points. Such embodiments can be implemented using techniques familiar to those having ordinary skill in the art.

Policy distribution points can be operated in push mode in some cases (policy, or policy changes, is sent to policy management points when policy changes). Policy distribution points can operate in pull mode in all cases (i.e., policy management points request policy as needed or periodically from policy distribution point(s)).

Returning to FIG. 5, in some embodiments policy distribution points (5010a, 5010b, 5010c) and policy management points (5040, 5050, 5060) each operate as policy distribution points. Each policy distribution point may implement one or more of the policy distribution mechanisms described above.

In some embodiments, some policy distribution points accept "reverse channel" communications for reporting errors or un-resolvable policy conflicts from subsidiary policy management points. This reverse channel may be used to trigger modification of policies, to correct errors or remove conflicts, and their subsequent re-distribution and re-allocation. In a first exemplary non-limiting scenario, a first policy distribution point (5010b) distributes a first policy and a second policy distribution point (5010c) distributes a second policy to a first policy management point (5040) in a policy cloud. After aggregating and resolving conflicts between the first policy and the second policy, the resulting third policy is allocated to a second policy management point on a device (5060). Had there been errors resulting from aggregation or conflict resolution, the first policy management point (5040) could have notified the policy distribution points (5010b & 5010c), notified a policy administrator, or such other actions as its design and configuration specified. The second policy management point (5060) does not need to aggregate or resolve conflicts in the third policy, as this was already done by the first policy management point (5010b) before the policy was delegated, and there are no additional sources of policy for the second policy management point (5060). The second policy management point (5060) allocates policy to a policy enforcement point on the device (5100) where policy is enforced.

In a second exemplary non-limiting scenario, a first policy distribution point (5010b) distributes a first policy and a second policy distribution point (5010c) distributes a second policy to a first policy management point (5040) in a policy cloud. After aggregating and resolving conflicts between the first policy and the second policy, the resulting third policy is allocated in part to a policy enforcement point (5070), such as a network firewall (not shown), or an application policy enforcement point generator (not shown) that will create a distributable application policy enforcement point that encapsulates an application and contains embedded policy elements, and in part to a second policy management point on a device (5060). Had there been errors resulting from aggregation or conflict resolution, the first policy management point (5040) could have notified the policy distribution points (5010b & 5010c), notified a policy administrator, or such other actions as its design and configuration specified. The second policy management point (5060) does not need to aggregate or resolve conflicts in the third policy, as this was already done by the first policy management point (5010b) before the policy was delegated, and there are no additional sources of policy for the second policy management point (5060). The second policy management point (5060) allocates policy to a policy enforcement point on the device (5100) where policy is enforced.

In a third exemplary non-limiting scenario, a first policy distribution point (5010b) distributes a first policy and a second policy distribution point (5010c) distributes a second policy to a first policy management point (5040). After aggregating and resolving conflicts between the first policy and the second policy, the resulting third policy is delegated to a second policy management point on a device (5050). Had there been errors resulting from aggregation or conflict resolution, the first policy management point (5040) could have notified the policy distribution points (5010b & 5010c), notified a policy administrator, or such other actions as its design and policy specified. The second policy management point (5050) also receives a fourth policy from a third policy distribution point (5010a), such as a local LAN policy server, or device policy. The fourth policy is aggregated with the third policy by the second policy management point (5050) to produce a fifth policy, and any conflicts resolved. Had there been errors resulting from aggregation or conflict resolution, the second policy management point (5050) could have notified the policy distribution point (5010a) and/or the delegating policy management point (5040), notified the device user or a policy administrator, or such other actions as its design and policy specified. Upon receiving notification of the error from the second policy management point (5050), the first policy management point (5040) could have notified the policy distribution points (5010b & 5010c), notified a policy administrator, or such other actions as its design and policy specified. The second policy management point (5050) then allocates policy elements to various policy enforcement points on the device (5080 & 5090), which may or may not be of the same type, depending on implementation decisions and/or policy requirements. The second policy management point (5050) may also delegate policy elements to another policy management point (5560), such as a policy management point in a hypervisor-type virtual machine that is running on the device.

6.5 Exemplary System Architecture and Implementations

Figure 11:
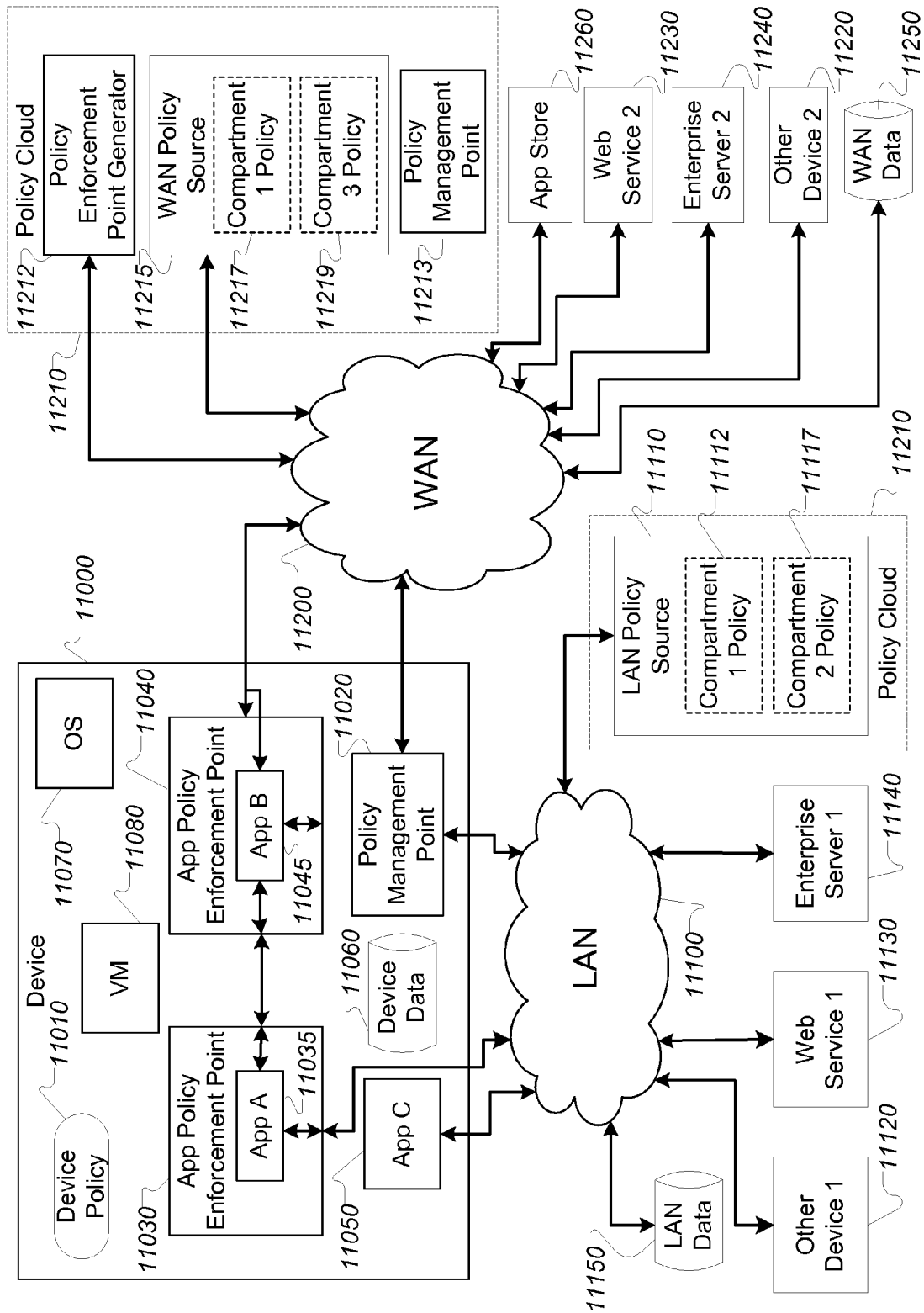
FIG. 11 is an exemplary implementation architecture shown in a network of devices, according to one embodiment of the invention.

FIG. 11 illustrates some of the components that make up an exemplary system of the invention, as well as some other systems and components that exemplary system components can interact with. The three main divisions are those components that are local to a device (11000), those that are accessible by a device (11000) through a Local Area Network (LAN, 11100) such as an Ethernet, a Wi-Fi wireless network, or a peer-to-peer network such as Bluetooth, and those that are accessible by a device (11000) through a Wide Area Network (11200), such as a cellular data network, or the Internet. The provision and general characteristics of the aforementioned devices will be familiar to those having ordinary skill in the art.

Device (11000) local components comprise device policy (11010), at least one policy management point component (11020), zero or more policy enforcement point components. such as application policy enforcement points (11030 & 11040) that encapsulate compartmented applications such as Application A (11035) and Application B (11045), zero or more global applications, such as Application C (11050), and optionally device data (11060), such as sensor inputs, application files, configuration settings, etc. Devices also typically have an operating system (OS) (11070) and may include one or more virtual machines (VMs) (11080), whether hypervisor types (e.g. VMware, Xen, etc.) or language support types (e.g. Java's JVM or Dalvik).

Device policy (11010) comprises device settings, policy rules, or other specifications that are used to control device operation in devices that do not host exemplary embodiments of system components. Device policy (11010) can be aggregated with compartment policies, and conflicts resolved, to determine the policy that is actually implemented for a compartment. In some implementations, device policy is dynamically adjusted by application policy enforcement points as applications gain and lose focus on the device. This can be useful to enable existing device mechanisms to assist with enforcement of compartment policy.

Policy management point components (11020) comprise software useful to receive policy and policy updates from external policy distribution points, such as a LAN Policy distribution point (11110) or a WAN Policy distribution point (11215), to aggregate and resolve conflicts between policy elements of such policies, to determine which compartmented applications, or about to be compartmented applications, the policies apply to, and to allocate policy elements to policy enforcement points of compartmented applications accordingly. Allocation can be based on a plurality of factors, such as policy specification of specific devices that policy elements apply to, the specific policy enforcement types used to implement policy elements contained in the policy and the devices that require them, the policy enforcement point types available on a specific device, attributes of specific policy elements, policy elements that specify how policy is to be allocated (e.g. policy enforcement type preference values), or other factors as will be apparent to those with skill in the art. In cases involving federated or nested compartments, policy elements can instead be delegated to federated or nested compartment policy management points (not shown) for allocation or further delegation. In some implementations, policy management points (11020) may also cause applications to be updated with versions that incorporate aspects of policy as required. In at least some embodiments, policy management point components (11020) also comprise functionality for instantiating a compartment on a device.

Some policy enforcement points, such as application policy enforcement points (11030 & 11040), establish policy-required environments in which applications (11035 & 11045) are instantiated and run, and moderate application (11035 & 11045) interaction with other components as required by the policy for the compartment the application belongs to, including permitting, blocking, logging, and modifying attempts to read or write data, open or accept connections, or access resources outside of the application's own encapsulated environment.

Policy enforcement points can be created by a policy enforcement point generator (11212). In the case of application policy enforcement points (see above), the policy enforcement point generator (11212) modifies the un-compartmentalized application instance manifest for use as the application policy enforcement point manifest by expanding application permissions sufficiently, when necessary, to permit the application policy enforcement point to function. The manifest, or other configuration data created by the policy enforcement point generator (11212) for use by the application policy enforcement point, specifies the application to be run, and any compartment policy that is to accompany the application policy enforcement point at installation time. When a new version of the compartmented application is released, the policy enforcement point generator (11212) generates a new version of the compartmented application's policy enforcement point, using the latest manifest for the encapsulated application. In this way the compartmented application is kept current with the un-compartmented version of the application. Note that the compartmented application itself is not necessarily part of the application policy enforcement point installation package. The application policy enforcement point, when instantiated, can load the existing application executable that is already installed on the device into the compartmented environment created by the application policy enforcement point. In some cases the application executable may be included in the application policy enforcement point installation for convenience, but this is not a requirement.

Policy distribution points, such as the LAN or WAN policy distribution points (11110 & 11215) provide policy to policy management points (11020). Policy can be supplied in whole, or as updates to prior policies. Policy can be labeled as to which application each policy element applies to or be unlabeled, which requires the policy management point (11020) to determine the allocation of policy on the device. In some exemplary embodiment each policy is for a single compartment; however, policies for a plurality of compartments can be supplied together, with a multi-compartment policy management point delegating each policy to policy management points in the relevant compartments.

Policy distribution points (e.g., 11110 & 11215) can supply policy in a "pull mode" when policy management points (11020) request it, or in a "push mode" when policy changes, periodically, or when commanded (e.g. by a system administrator). Policy management points (11020) can deal with policy delivered in any of these modes. Policy distribution points may be implemented as standalone special purpose devices, common or proprietary software on commonly available systems, databases, networked file servers, or other similar methods.

Compartment policies (e.g., 11112, 11117, 11217, & 11219) specify limitations and permissions for access to, or by, other components for compartmented applications (e.g., 11035 & 11045). Compartment policy also specifies any mandatory applications, optional applications, and prohibited applications. Mandatory applications are applications that must be present on a device or in a compartment for the device to be in compliance with compartment policy. Optional applications are applications that may be present on a device or in a compartment without violating compartment policy. Prohibited applications are applications that may not be installed on a device at the same time as the compartment, or that may be installed but may not be instantiated while compartment applications are instantiated on the device. Compartment policies are dynamic, and not limited to those specified with a manifest or other configuration at compartmented application installation time. Policies from policy distribution points (e.g., 11110 & 11215) can be sent to an on-device policy management point (11020), which determines which applications the updated policy elements apply to, and passes them to the associated policy enforcement point, such as an application policy enforcement point, for implementation. The policy enforcement point then alters its behavior and/or the environment of the application to comply with the updated policy for the application. Policy in some exemplary embodiments can be specified as one or more XML documents. For example:

```
<compartment_policy>
  <data>
    <policy_id>
      <version="1.4"/>
      <serialnum="20130730142305"/>
    </policy_id>
    <compartment_id value="{GID}"/>
    <compartment_name value="enterprise.com"/>
    <key value="{compartment key value}"/>
    <authcert value="{authentication certificate}"/>
  </data>
  <key_handling>
    <storage>
      <permitted value="keyring"/>
      <permitted value="EFS"/>
      <preferences value="keyring, EFS"/>
    </storage>
    <access>
      <compartment value="unlimited"/>
      <extra-compartment value="none"/>
    </access>
  </key_handling>
  <policy_handling>
    <policy_sources>
      <url value="policy://policy1.enterprise.com/"/>
      <url value="policy://policybackup.enterprise.com/"/>
    </policy_sources>
    <policy_updates>
      <frequency value="hourly"/>
      <triggers value="new-app, on-boot"/>
    </policy_updates>
    <conflicts>
      <method type="priorities" level="1"/>
      <method type="error" level="2"/>
    </conflicts>
    <allocations>
      <enforce_prefs value="OS, compartment"/>
      <PEP_src value="https://enterprise.com/PEPGen"/>
      <filePEP value="OSFS-PEP || App-PEP"/>
      <netPEP value="VPN-PEP"/>
      <ipcPEP value="IPC-PEP && App-PEP"/>
    </allocations>
  </policy_handling>
```

```
  <applications priority="high">
    <app name="firstapp" type="required" checksum={checksum} conditional="dev='Blackberry'"/>
    <app name="firstapp" type="prohibited" checksum={chksum} conditional="dev!='Blackberry'"/>
    <app name="optapp" type="permitted" checksum={value}/>
    <app name="badapp" type="prohibited" checksum={value}/>
    <app_sources>
      <source name="SIM-card" permitted="no"/>
      <source_name="app-store" permitted="yes"/>
    </app_sources>
  </applications>
  <access_control priority="required" delegatable="yes">
    <file name="~/local/file1" PEP="OSFS-PEP">
      <application name="firstapp">
        <permissions>
          <read allowed="yes"/>
          <write allowed="no"/>
          <delete allowed="no"/>
          <append allowed="no"/>
          <modify allowed="no"/>
        </permissions>
      </application>
      <application name="secondapp" PEP="App-PEP">
        <permissions>
          <read allowed="yes"/>
          <write allowed="yes"/>
          <delete allowed="yes"/>
          <append allowed="yes"/>
          <modify allowed="yes"/>
        </permissions>
      </application>
    </file>
    <network url="http://enterprise.com/dept2/home.html PEP="VPN-PEP">
      <link>
        <dev value="/dev/VPN1" required="yes" priority="optional"/>
      </link>
      <application name="firstapp">
        <allowed="yes"/>
        <restriction-time="0800-1700 EST"/>
      </application>
    </network>
    <network url="http://enterprise.com/dept2/costdata.bin PEPtype="network">
      <link>
        <dev value="/dev/VPN1" required="yes" priority="required"/>
      </link>
      <application name="secondapp">
        <allowed="no"/>
      </application>
    </network>
    <protections>
      <at_rest>
        <store loc="~/local" priority="required"/>
        <OS_prot value="400" priority="high"/>
        <encrypt value="yes" priority="required"/>
      </at_rest>
      <in_motion>
        <encrypt value="yes" priority="required"/>
        <protocols value="SCP, SFTP,
```

-continued

```
        HTTPS"/>
      </in_motion>
      <in_use>
        <tagging value="no"/>
      </in_use>
    </protections>
    <archive>
      <item ID="1">
        <what url="~/audit.log"/>
        <when value="create, destroy, daily, size>50kb"/>
        <how cmd="scp ~/audit.log scp://secure.com/logs"/>
      </item>
    </archive>
    <compartment_relations>
      <nested ID="1233456789">
        <parent ID="dep2"/>
        <key value="{keyvalue}"/>
        <children value="no"/>
      </nested>
      <federated ID="ABC987654321">
        <key value="{keyvalue}"/>
        <default_access value="read, write"/>
        <file name="~/local/file3">
          <permissions>
            <read allowed="yes"/>
            <write allowed="no"/>
            <delete allowed="no"/>
            <append allowed="no"/>
            <modify allowed="no"/>
          </permissions>
        </file>
      </federated>
    </compartment_relations>
  </access_control>
</compartment_policy>
```

Other components include, but are not limited to, compartmented applications (11035 & 11045), global applications (11050), device policy (11010), device data (11060), LAN access (11100), LAN data (11150), other devices on a LAN (11120), Web services on a LAN (11130), servers on a LAN (11140), LAN policy distribution points (11110), policies stored in LAN policy distribution points (11112 & 11117), WAN access (11200), WAN data (11250), other devices on a WAN (11220), Web services on a WAN (11230), servers on a WAN (11240), WAN policy distribution points (11215), and policies stored in WAN policy distribution points (11217 & 11219).

A single device can support zero or more compartments at any given time. Each policy enforcement point, such as application policy enforcement points (e.g 11030 & 11040. 4030 & 4040), uses the policy for the compartment it belongs to in order to moderate access to and from the compartmented application.

Global applications, such as Application C (11050) can connect with limitations depending only on device policy (11010). For example, a connection between Application C (11050) and LAN Data (11150) through the LAN (11100) is not moderated by any policy enforcement point.

6.5.1 Local Device Implementation, with Local Policy Enforcement Points

Figure 12:
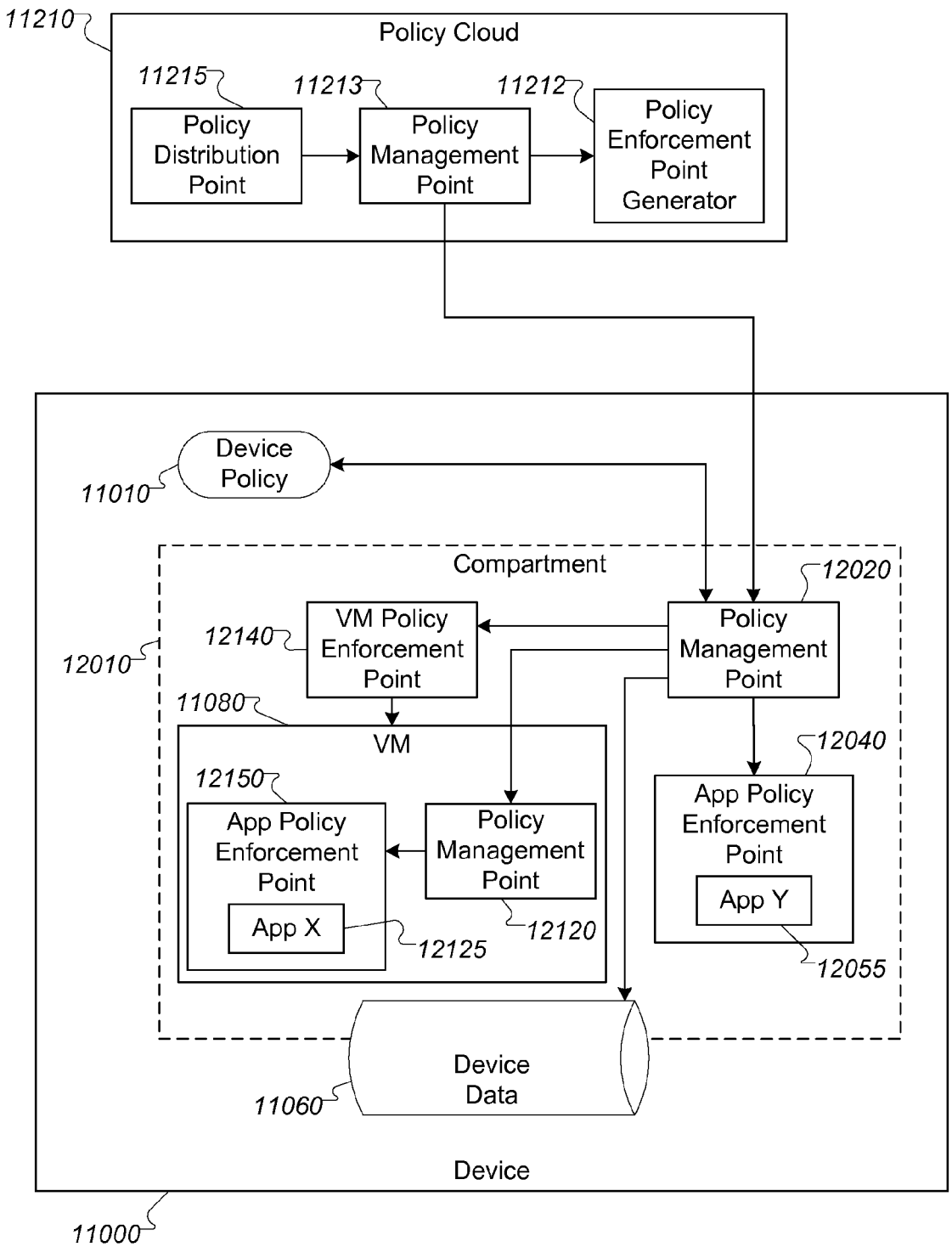
FIG. 12 is a diagram of some of the components of FIG. 11, showing logical relationships between several aspects of the invention, according to one embodiment of the invention.

FIG. 12 is an exemplary diagram of some of the components illustrated in FIG. 11, along with a compartment (1210) and its components, showing logical relationships between several aspects of the invention. The exemplary policy cloud (11210) comprises a policy enforcement point generator (11212) capable of generating policy enforcement points for use on specific device types, and optionally for use in specific compartments, and also optionally with embedded policy elements. A policy management point (11213) can supply the policy enforcement point generator (11212) with policy elements for embedding in policy enforcement points in such systems. The components and their connections can be implemented by those having ordinary skill in the art using the description and figures herein.

A policy management point in a policy cloud (11213) receives policy elements from one or more policy distribution points (11215), and delegates it to policy management points on policy-appropriate devices (12020). These policy management points (12020) allocate policy elements to various policy enforcement points, such as VM policy enforcement points (12140) or application policy enforcement points (12040), and can also delegate policy elements to other policy management points, such as a policy management point located inside a VM (12120), which then allocate policy elements to policy enforcement points, such as application policy enforcement points (12150).

Policy management points on devices (12020) can also manage shared storage for a compartment (12010) that is located in device data storage (11060). Shared compartment storage is typically maintained by use of encrypted file systems, access restricted data storage, or other means that limit access to shared storage to applications that are in the compartment.

Policy enforcement points (12040, 12140, & 12150) can be of various types, depending on their intended use, the capabilities of the device OS, and other factors. Examples of types of policy enforcement points can include, without limitation, application policy enforcement points (12040 & 12150) that serve to encapsulate compartmentalized applications (12055 & 12125), VM policy enforcement points (12140) that can adjust VM configuration settings so as to enforce at least one aspect of policy, and device OS policy enforcement points (not shown) that can adjust device policy and/or OS configuration settings so as to enforce at least one aspect of policy. How policy is allocated to policy enforcement point is controlled by the design of the policy management point components for default behavior and by compartment policy, which overrides default behaviors or specifies new default behaviors. For example, if the default behavior is to allocate policy elements having to do with file access to a policy enforcement point that uses OS-supported file access controls, compartment policy can override this and specify that file access policy enforcement is to be done using a policy enforcement point that encrypts file contents, and provides access to decrypted file content only to specific compartment applications listed in the compartment policy as having such access. The policy elements that specify this override of default behavior can be specified in policy as conditional such that the override occurs only on specific devices, only on specific device types, or on devices running a specific operating system. Different overrides can be specified in this way for different devices, OSs, or based on other device attributes or other factors such as the presence of specific files or applications within a compartment on a device.

6.5.2 Local Device Implementation with Multiple Compartments, Showing Compartment Enforced with a Plurality of Enforcement Points.

Figure 13:
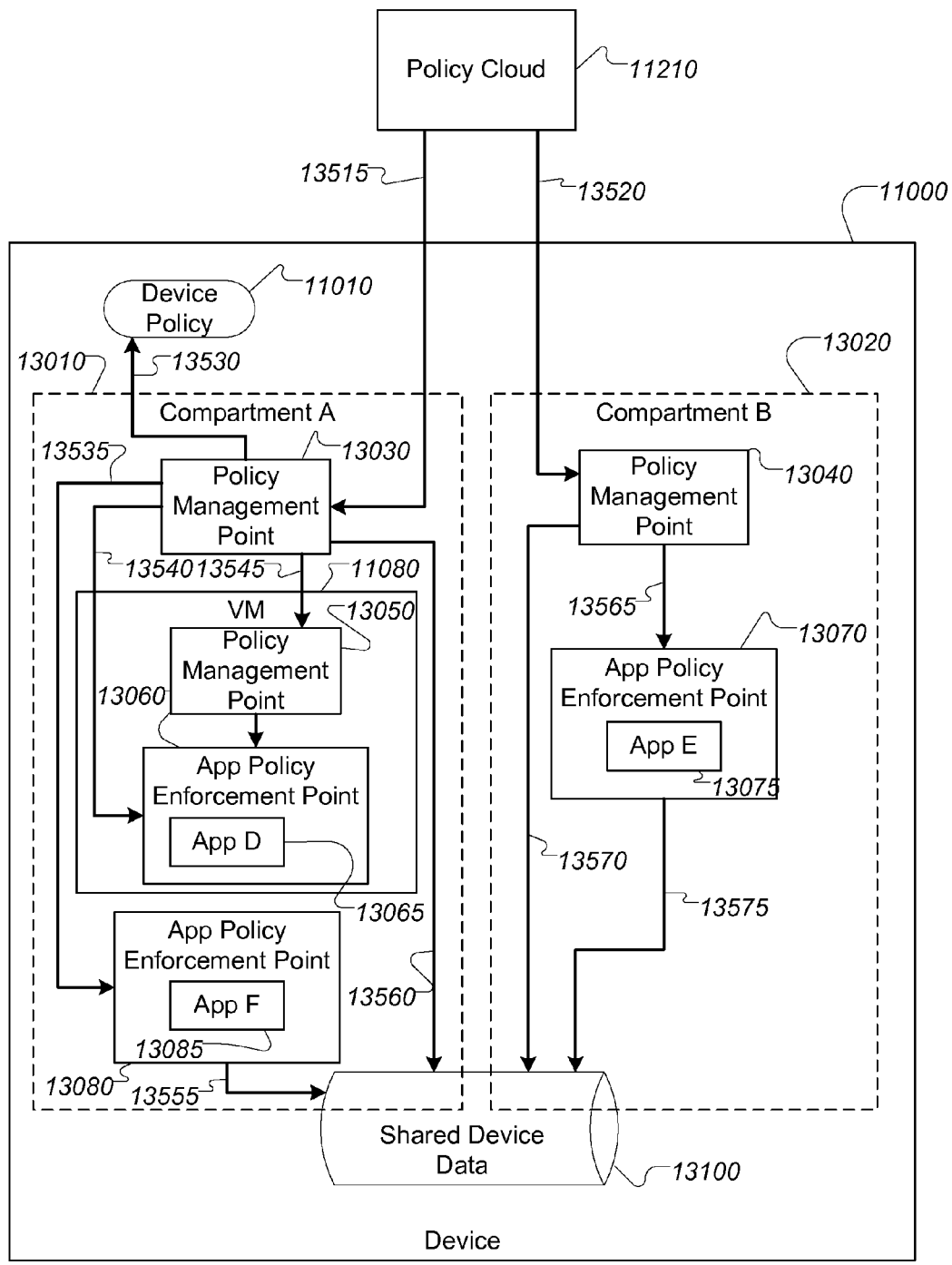
FIG. 13 is a diagram of some of the components of FIG. 11, showing logical relationships between several aspects of the invention when there is more than one compartment on a device, according to one embodiment of the invention.

FIG. 13 is a diagram similar to FIG. 12, but illustrating an embodiment having two compartments (13010 &13020) on a single device (11000). The policy cloud (11210) supplies policy for compartment A (13515) to a policy management point of compartment A (13030), and policy for compartment B (13520) to a policy management point of compartment B (13040). The components and their connections can be implemented by those having ordinary skill in the art using the description and figures herein.

Compartment B (13020) has only one application policy enforcement point (13070) that receives allocated policy (13565) from the compartment B policy management point (13040) and uses it to enforce policy on Application E (13075), such as policy controlling access to shared device data (13575). The compartment B policy management point (13040) also manages a shared data area (13570) in device data storage (13100) for use by compartment B (13020) applications, such as policy management points (13040), application policy enforcement points (13070), and compartmentalized applications (13075).

Compartment A (13010) has both an application policy enforcement point (13080) that receives allocated policy (13535) from the compartment A policy management point (13030) and uses it to enforce policy on Application F (13085), such as policy controlling access to shared device data (13555), and a hypervisor VM (11080) that hosts Application D (13065) and its encapsulating application policy enforcement point (13060) as well as a policy management point (13050) that receives delegated policy elements (13545) from the Compartment A policy management point (13030). Note that the Compartment A policy management point (13030) can optionally allocate policy directly to the application policy enforcement point for Application D (13060) in some exemplary embodiments.

6.5.2.1 Policy Manager

Some embodiments include a policy manager that is an implementation of a policy management point. The policy manager is implemented as a server or process on a device. It provides coordination of policy management operations, compartment management operations, and other related functions. These can be implemented by those having ordinary skill in the art using the description and figures herein.

As illustrated in FIG. 11, policy is supplied by one or more policy distribution points (11110 & 11215). Policy must be aggregated, conflicts resolved, policy elements allocated, and distributed by policy management points to appropriate policy enforcement points (e.g. those enforcing policy over applications (11030 & 11040), VMs (11080), or OSs (11070)) or other policy management points. Each policy management point can aggregate additional policy from the same or different policy distribution points, resolve conflicts in the aggregated policy, allocate policy elements and distribute them to other policy management or policy enforcement points. The policy supplied by a policy distribution point (11110 or 11215) can comprise policy elements related to a device (11000), its OS (11070), one or more applications (11035 & 11045) or VMs (11080), data 11060), or combinations of these. Policy must be allocated to the relevant components for enforcement.

When a device is supporting a plurality of compartments, it is possible for the policies of the various compartments to conflict, such as when two or more compartments each require different values of a device OS setting. In such cases the policy management points of one or more compartments can re-allocate the conflicting policy elements to different policy enforcement point (e.g. rather than using a device OS file protection capability to protect a file from being read, a policy enforcement point that encrypts the file and provides policy-controlled access to the file contents can be used instead). Alternatively, one or more of the policy management points can treat the conflict as an error and employ the error handler methods previously described above to resolve the conflict.

Figure 14:
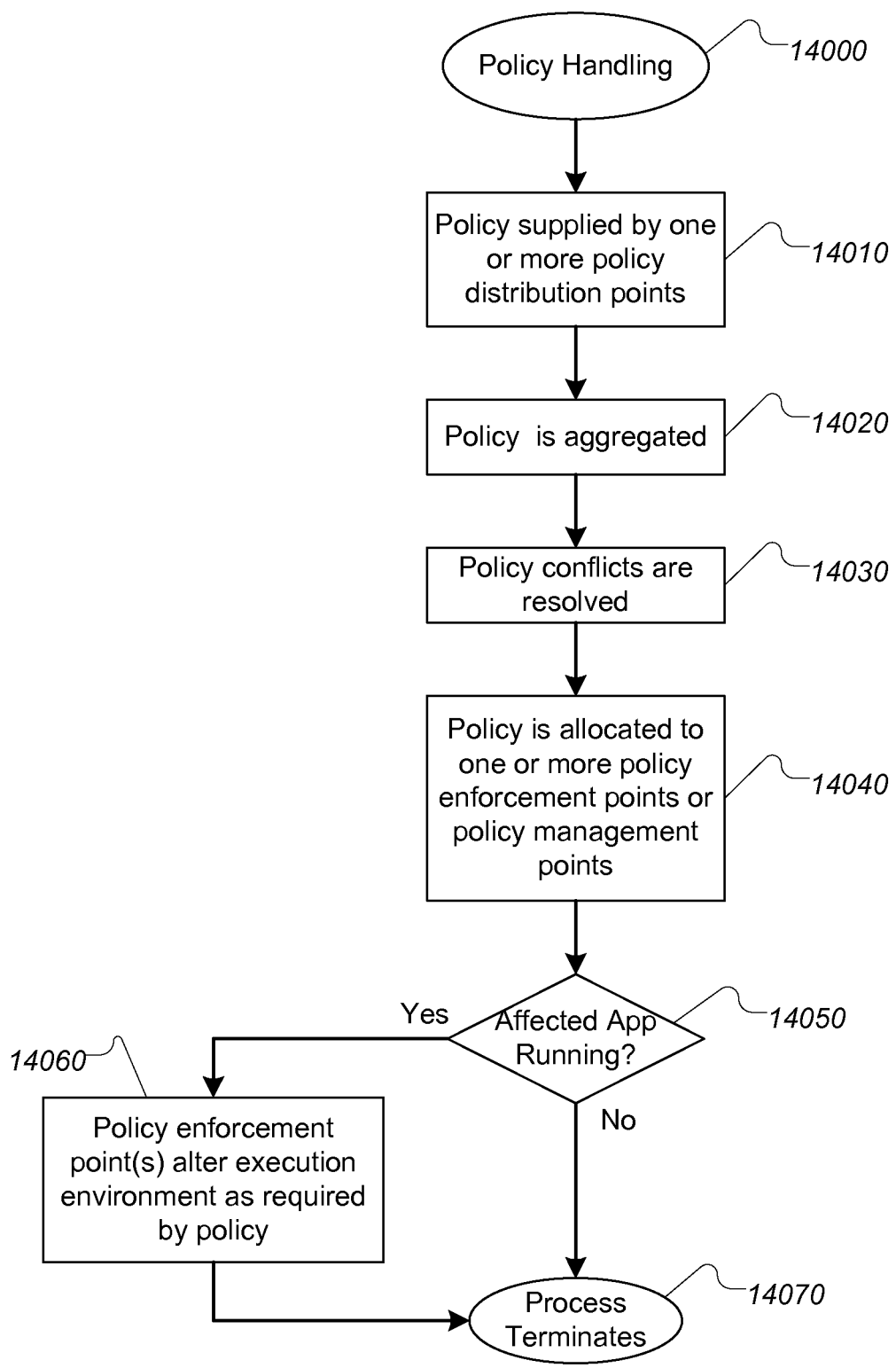
FIG. 14 is a flowchart describing policy handling, according to one embodiment of the invention, according to an embodiment of the invention.

An exemplary process for doing this is shown in FIG. 14 (14000). The process can be implemented by those having ordinary skill in the art using the description and figures herein. The process starts with policy being supplied by one or more policy distribution points (14010) to a policy management point. Policy distribution points can be policy servers, policy proxies, device policy, databases, configuration files, or previously supplied cached policy elements (e.g. new policy can be a partial update to previous policy, rather than a complete replacement policy). The policy elements from the various policy distribution points are aggregated (14020), and then conflicts are resolved (14030). Policy conflicts can be resolved using known methods, such as prioritizing one source over another, selecting more restrictive policy elements over less restrictive elements, selecting more recent policy elements over older policy elements, etc. Policy is then allocated and distributed to policy enforcement points or delegated to additional policy management points (14040). In some cases policy elements come tagged with information indicating which policy enforcement points or policy management points the policy elements are to be allocated to, while in other cases there is no such tagging and the policy management points determine the allocation.

Directed allocation tagging can be specific, such as specifying a particular instance, type, or attribute(s) required of policy enforcement point that is to enforce the policy element. For example, a policy may comprise one or more of:

- a specification of a particular application and/or policy enforcement point that the policy is to be allocated to,
- a specification of an attribute or capability that a policy enforcement point must possess in order to process the policy element, for example, that a policy enforcement point must operate securely, or that the policy enforcement point must be distributable,
- a specification that the policy element applies to a specific storage mechanism, for example, file storage, that should be enforced by a file storage policy enforcement points, and
- a specification of a class of applications that have a specific attribute, capability, or tag, for example, an application that is digitally signed by a provider, or one that requests access to specific device resources such as the camera or network connections.

A policy management point allocator determines specific allocations for each policy element and allocates the elements to the appropriate policy enforcement points or delegates them to other policy management points.

In some cases there may be a plurality of options for allocating policy. For example, a policy can require that network connections be made over encrypted links. Allocation of such a policy could in some instances be made to the policy enforcement points for each application that uses network connections, or to a policy enforcement point that configures the network connection components of the OS. Which allocation is preferred can be defined by the implementation. for example, the preferred allocation can be to allocate to the fewest policy enforcement points possible (i.e. to the policy enforcement point controlling the OS network connection component in this case), or preference can be defined in policy, for example specifying that allocation is to be to network-capable applications, or to specific applications.

Once policy has been allocated to policy enforcement points (14040), checks are made to see if applications are running that are affected by the allocated policy elements (14050). For example, if policy elements having to do with network connections are allocated, then applications that are using network connections may be affected. Policy enforcement points cause the execution environments for affected applications to change as required by policy (14060). In some cases this can cause immediate closure of network connections, file accesses, inter-process communication sessions, or other in-progress activities. In other cases, the application is allowed to continue operations, but in a different manner. For example, if a network connection is no longer allowed to a given server over an unencrypted link, the policy enforcement point can open a new connection over an encrypted link and re-route traffic from an application through the new link. The network session would be interrupted briefly, but not disrupted as far as the encapsulated application is concerned. Once policy has been allocated, and any running application environments adjusted as required, the process is complete (14070).

In some embodiments, the compartment management operations include the operations shown in Table 2 below:

TABLE 2

| Compartment Management Operation | Description |
| --- | --- |
| Create | Create a compartment |
| Instantiate | Instantiate (instance) a compartment upon a device. |
| Disable | Disable a compartment upon a device |
| Destroy | Destroy a compartment on a device (reverse of instantiate) |
| Archive | Archive a compartment on a device |
| Synchronize | Synchronize a compartment on a device with another device |
| Change | Change an allocation |

6.5.2.1.1 Compartment Create

In some embodiments, compartments are defined by policy and are instantiated upon one or more devices by policy manager(s). Compartments can be created at any level in the policy hierarchy (e.g. in the policy cloud by an enterprise, on a device by a device user, etc.). A compartment is created by defining compartment characteristics (name, ID, signing keys, policy, etc.) and adding these definitions to a policy. In some implementations, a compartment instantiation application may be generated in order to instantiate a compartment on a device. By installing and instantiating such an application, a device user or a policy manager can install a compartment on a device. Compartment backup or synchronization can optionally occur, as specified by compartment policy, upon compartment installation on a device. This has the effect of pre-populating the local compartment with information from the source compartment upon creation of the local compartment. The forgoing can be implemented by those having ordinary skill in the art using the disclosure and teachings herein.

6.5.2.1.2 Compartment Instantiate

In some more specific embodiments, compartments are instantiated on a device by a policy manager using the initial policy elements in a compartment policy included as part of compartment installation on a device and/or downloading the policy that defines the compartment and carrying out the actions required to instantiate the compartment, or by installing and instantiating a compartment instantiation application that creates an instance of the compartment on the device. Actions necessary to instantiate a compartment on a device can include, but are not limited to, getting the compartment name, ID, signing keys, policy distribution point(s), compartment policy, and any mandatory applications. Compartment backup or synchronization can optionally occur, as specified by compartment policy, upon compartment instantiation. As will be understood by those having ordinary skill in the art, this has the effect of pre-populating the local compartment with information from the source compartment upon instantiation of the local compartment.

In more specific embodiments of the forgoing, if a compartment instantiation application or policy manager determine that the device is not permitted by policy to join the compartment, it deletes any compartment-related information, and may also delete itself, inactivate itself, or otherwise prevent use of compartmented data and applications. Compartment backup or synchronization can optionally occur, as specified by compartment policy, upon compartment deletion.

Figure 15:
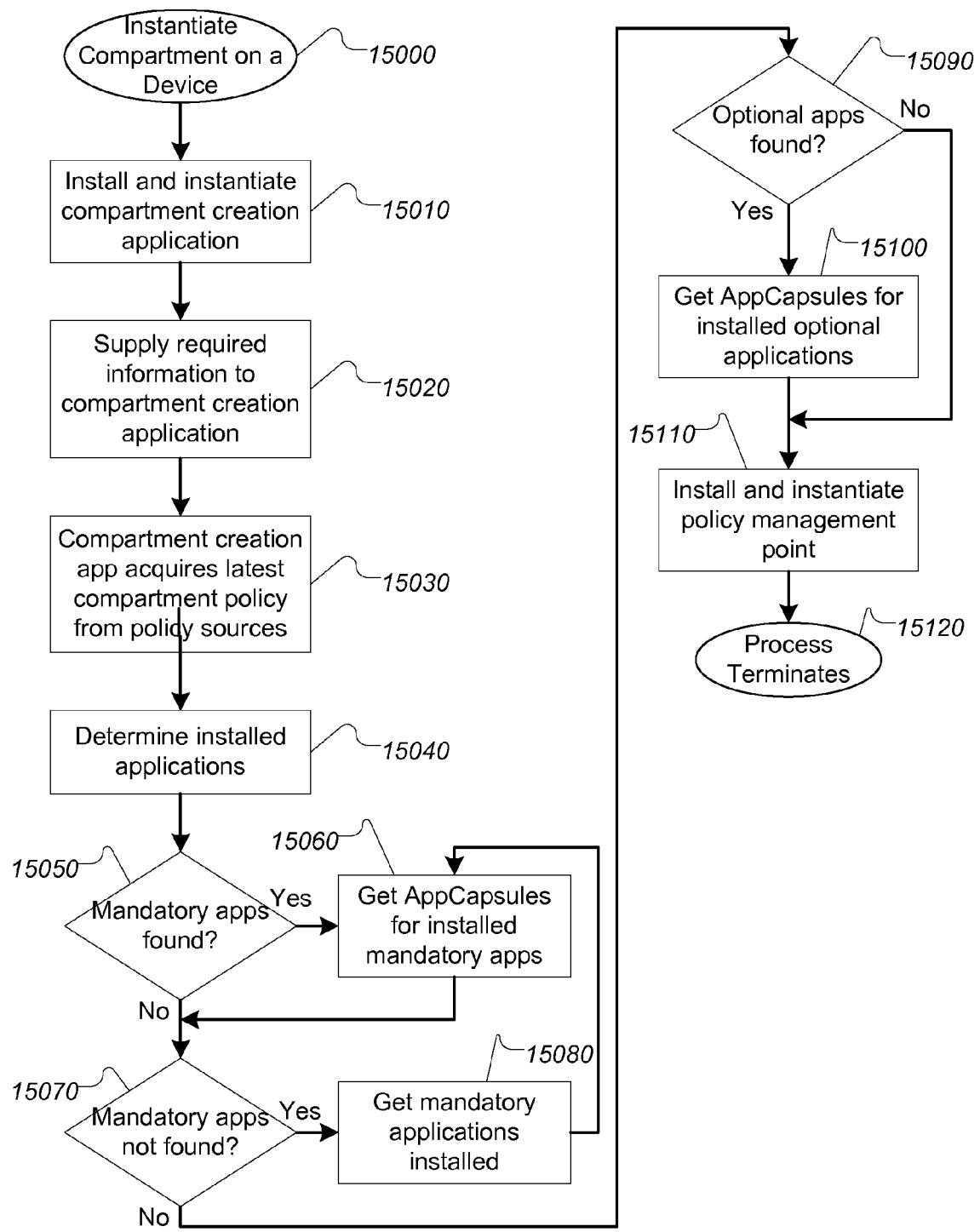
FIG. 15 is a flowchart describing compartment instantiation on a device, according to one embodiment of the invention.

FIG. 15 shows steps for an exemplary instantiation of a compartment on a device (15000). The process in this example starts with the installation and instantiation of a compartment instantiation application (15010). In some exemplary implementations, the compartment instantiation application may function as a policy management point for the compartment it creates. In alternative exemplary implementations, compartment instantiation applications are separate from policy management points, and function only to create compartment instances. The process can be implemented by those having ordinary skill in the art using the description and figures herein.

Required information is supplied to the compartment instantiation application (15020) by the device user or a policy cloud component, such as a policy distribution point or policy management point. In some exemplary embodiments compartment instantiation applications are generated for each compartment, with required information embedded in the application. The compartment instantiation application then acquires the latest compartment policy from one or more policy distribution points (15030), and resolves any conflicts. A determination is then made of what applications are installed on the device (15040), and a check made to see what mandatory applications are already installed on the device (15050). Application policy enforcement points are required for those mandatory applications that are already installed on the device (15060). If there are mandatory applications that were not found on the device (15070), those applications are acquired and installed (15080), by the compartment creation application, or by requesting that the user do so, depending on the capabilities supported or permitted by the device OS. Application policy enforcement points are then acquired for the acquired mandatory applications (15060). In some cases the application policy enforcement points may need to be generated by a policy enforcement point generator, whether in the policy cloud or on the device hosting the compartment. Once all mandatory applications have been installed and added to the compartment through acquisition of Application policy enforcement points for them, a check is made for installed optional applications (15090). If any are found, Application policy enforcement points are acquired for them (15100) to add them to the compartment. The compartment instantiation application then installs and instantiates a policy management point for the compartment, which allocates and distributes the compartment policy to policy enforcement points (15110), such as Application policy enforcement points, device settings, OS features, etc. and the process is complete (15120).

6.5.2.1.3 Compartment Disable

Some embodiments include compartment disablement when there is an un-resolvable policy conflict in compartment policy specification, when policy requires it (e.g. when a device is no longer permitted by compartment policy, or while a device is at, or not at, a specified location, or while a device is using, or not using, particular communication methods), when it is desired that a compartment not be in use on a device temporarily (e.g. when the device is lent to a different user, or when a device user is on sabbatical), or in other circumstances when a compartment is not to be usable, but compartment removal is not desirable. The process can be implemented by those having ordinary skill in the art using the description and figures herein.

Disabling a compartment can be accomplished in a variety of ways, as will be understood by those having ordinary skill in the art. The simplest method is to add a policy element to the policy allocated to a device that supersedes other policy elements and that disqualifies the device from participation in the compartment. Such a policy element can be conditional. For example, to disable the compartment for a specific time range, or while at a particular location, or while away from a particular location, etc.

Alternatively, a compartment can be disabled by changing compartment access keys, and not providing the updated keys to the device, or to the policy manager(s) in the compartment. When the compartment is to be re-enabled, the updated keys are provided, which re-enables the compartment. Other methods will be apparent to those having ordinary skill in the art.

Compartment backup or synchronization can optionally occur, as specified by compartment policy, upon compartment disablement. This can be implemented by those having ordinary skill in the art.

6.5.2.1.4 Compartment Destroy

Some embodiments include destroying a compartment on a device when there is an un-resolvable policy conflict in compartment policy specification, when policy requires it (e.g. when a device is no longer permitted by compartment policy and policy specifies removal in such cases), when a compartment owner no longer wants the compartment to exist anywhere, or when it is desired that a compartment not be in use on a specific device or devices anymore (e.g. when the device is transferred to a different user, when a device user is no longer associated with the compartment owner, when the device user no longer wants the compartment on the device for any reason), or in other circumstances when a compartment is not to be usable anymore on a device or devices. This can be implemented by those having ordinary skill in the art.

Destroying a compartment on a device requires that currently running applications in the compartment be halted, the application policy enforcement points that enable their participation in the compartment be removed along with their local data (optionally after archiving), all compartment access keys be deleted from key storage, compartment shared storage be removed (optionally after archiving as described below), policy enforcement points be removed, and the policy manager or other policy management points be removed.

Figure 16:
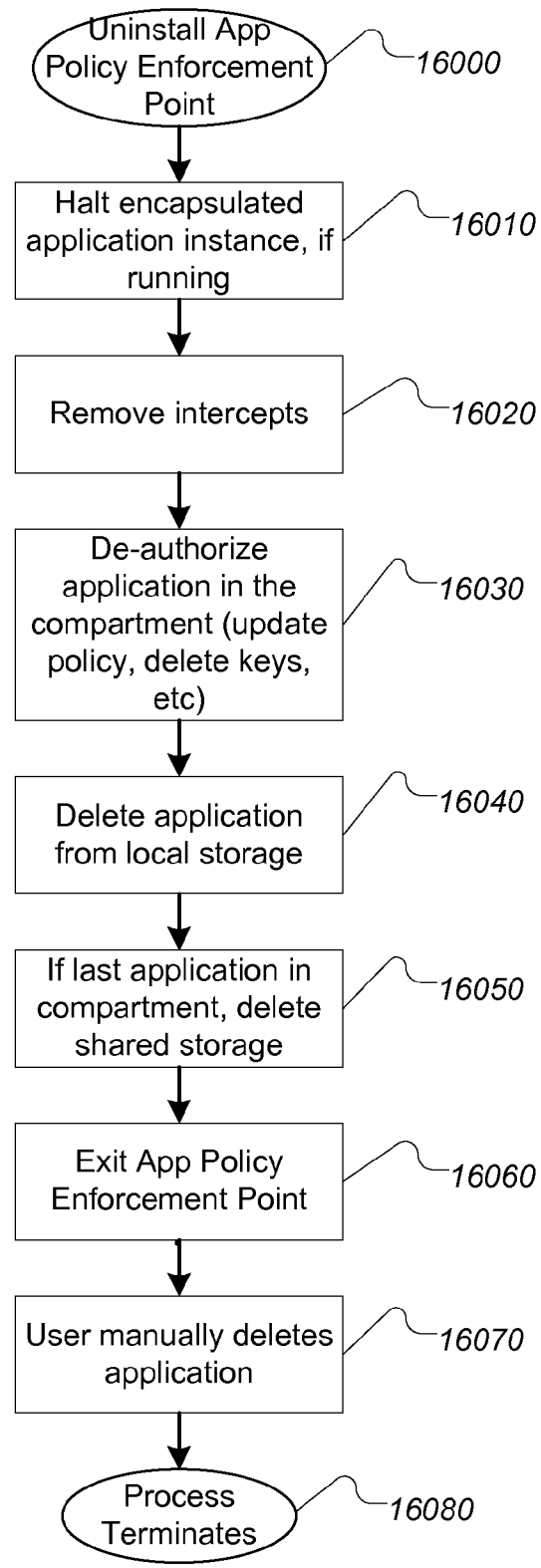
FIG. 16 is a flowchart showing removal of an application policy enforcement point, according to one embodiment of the invention.

Removal of an application policy enforcement point for an application (11030 & 11040) involves a number of steps, as shown in FIG. 16 (16000). (9000). In the illustrated exemplary embodiment, the steps are coordinated by a policy management point, such as a policy manager, but the actions can be performed by the policy management point, the application policy enforcement point for the application being removed, or both. The process can be implemented by those having ordinary skill in the art using the description and figures herein.

The first step is to halt the running application if it is currently instantiated (16010), and to remove any OS intercepts (16020) that may have been set up to enable the application policy enforcement point for the application to encapsulate the application's access to resources. This may involve replacement of dynamic link libraries, restoration of hardware vectors, calls to OS functions, etc. as required by the specifics of a particular device and OS implementation. If the application policy enforcement point for the application to be removed is not running, it must be started so it can perform the required removal steps in some implementations. In other implementations the removal steps can be done by other components, such as a policy management point (11020). In cases where the application policy enforcement point for the application must be started, the application policy enforcement point for the application does not load the encapsulated application, but just performs the removal steps and exits.

The next step is to de-authorize the application in the compartment (16030). This can involve deletion of encryption keys, updating policy settings in the policy management points and policy enforcement points (11020), or notification of a policy distribution point (11110 or 11215). De-authorizing the application prevents access to compartment data by the application's application policy enforcement point, and a check for authorization at the application policy enforcement point for the application startup prevents re-starting of de-authorized applications in the compartment. Applications may still be usable as global applications on the device however, as long as they do not rely on compartment access to function, so the encapsulated application is typically not uninstalled. For example, an application that displays device calendar data can function as a global application, but a calendar application that is coded to only display calendar data received through a compartment content provider will not be able to acquire any data to display. Whether an application can be used as a global application when de-authorized is dependent on the UI of the device and the method used to request application startup. For instance, if the compartmented application is started through an icon that is linked to an application policy enforcement point for the application, de-authorization will prevent startup, as the application policy enforcement point for the application will refuse to start the application. However, if there is a separate icon for starting the application outside of a compartment, the application can still be started through that icon as a global application.

The application-local storage deletion is next (16040). This can be a simple deletion of files or encrypted file systems in some cases, while in others there can be additional steps, such as backup or synchronization of the data to a backup storage location, or more thorough data deletion methods, such as repeated overwrites of data storage locations.

Shared storage is not deleted when an application policy enforcement point for the application is uninstalled, unless the policy enforcement point being removed is the last one on the device that accesses the shared storage. When it is the last application policy enforcement point that uses the shared storage, deletion of shared storage is performed using methods as described for application-local storage above (16050). In some implementations, shared storage is managed by a policy management point for the compartment (11020).

Once the above steps are complete the application policy enforcement point for the application exits (16060). Actual deletion of the application policy enforcement point for the application must be performed manually by a user (16070) in most cases (e.g. Android), but may be performed or requested by the application policy enforcement point for the application just before it exits using functions of the OS or by other means in some embodiments. This completes the removal process (16080).

6.5.2.1.5 Compartment Archive

In some embodiments, archiving a compartment on a device causes compartment shared storage, and optionally the local storage of the applications in the compartment, to be copied to an archive location. Archive locations can be network file servers, removable media in a device, the same compartment on another device, or other location as specified or permitted by compartment policy. Archiving of compartments can be done to safeguard compartment information against loss, for example, for regulatory reasons (e.g., Sarbanes-Oxley or HIPAA) or protection of trade secrets, to transfer compartment content from a first device to a second device when a user upgrades to a newer device, or for other reason, In one embodiment, when local application storage is to be archived, and is not maintained in a location accessible to the policy manager or other policy management point in the compartment, the application policy enforcement point for each application is commanded to copy its local data and that of its encapsulated application into compartment common storage, or other location as specified by policy. Once this is done, the compartment common storage is archived as specified in policy by the policy manager or other policy management point. This can be implemented by those having ordinary skill in the art.

6.5.2.1.6 Compartment Synchronize

In some exemplary embodiments policy can specify information that is to be made available to compartmented applications. When compartment policy requires such information to be present in a compartment on a device, the policy management point obtains the required information and transfers it to the device and places it in one or more policy specified locations. When a compartment is initially created with policy requiring such data, required information is preferentially obtained prior to any compartmented applications being instantiated. When policy changes so as to require information, information is obtained as soon as possible, but compartmented applications are permitted to continue execution is they are already instantiated. In such cases policy can specify whether applications controlled by the policy must be restarted or alerted once required information has been obtained. This can be implemented by those having ordinary skill in the art.

Information source and transfer method can be specified in policy using URLs, specification of one or more applications that are to be invoked optionally with options or arguments for each, scripts that are to be executed, or other such methods as will be well understood by those with skill in the art.

Specification of the location or locations where required information it to be placed, and any operations to be performed on it, can be through specification of file paths, reference to application directories (e.g. to place the information in the applications' local storage area), specification of commands to execute (e.g. SQL commands to load the information into a database management system, XML tool invocations to translate information into device-specific forms, etc.), or more generic specifications, such as specification of "common storage area".

In some exemplary embodiments, policy can specify that required information is to be re-obtained at intervals, or when specified events occur. For example, if required information relates to a company contacts directory, it may be useful to have policy specify that it is to be re-obtained on a daily basis, or each time the device is connected to the company VPN.

In some exemplary embodiments, policy can specify that required information is to be synchronized with its source when the copy on a device is changed (i.e. when information is added, deleted, or modified). Synchronization can be performed by copying the data back to the location it was obtained from, executing policy specified actions, or invoking a known application that will do so. Updates can be provided back to the information source as full copies of the required data, or as differences from the original, or by any other method as will be known to those with skill in the art.

6.5.2.1.7 Compartment Change

Compartment change is typically mandated by changes in compartment policy. Changes can require additional mandatory applications, permit additional optional applications, or prohibit previously permitted applications. Changes can also involve how policy is allocated within the compartment, or updated policy enforcement point implementations. Compartment backup or synchronization can optionally occur, as specified by compartment policy, upon compartment change.

Figure 17:
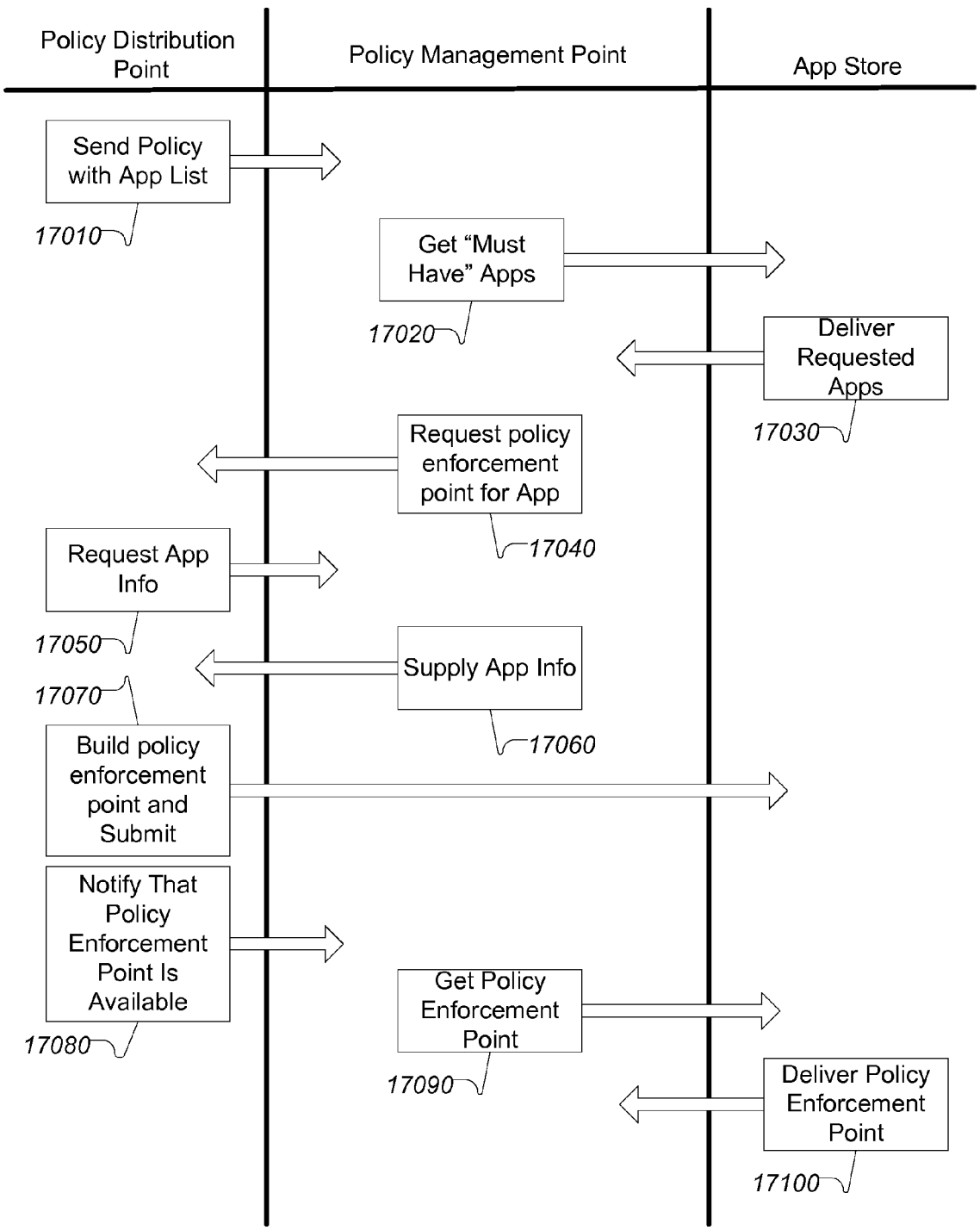
FIG. 17 is an interaction diagram showing interactions between a policy distribution point, a policy management point, and an application store during creation and installation of a policy enforcement point, according to one embodiment of the invention.

FIG. 17 describes exemplary interactions between a policy distribution point (5010*a*, 5010*b*, or 5010*c*), an on-device policy management point (11020), and an Application Store (11260) when a policy is created that requires a given application. The process begins (17010) with the policy distribution point (5010*a*, 5010*b*, or 5010*c*) sending the policy, with the required application included in the list of required applications, to the policy management point (11020) on the device (11000, FIG. 11). The policy management point (11020) requests (17020) any required application from the application store (11260), which delivers the application to the device (17030). The policy management point (11020) arranges to have the application installed, in some implementations with the device user's assistance, and then requests the application policy enforcement point for the application from the policy distribution point (e.g., 5010*a*, 5010*b*, or 5010*c* of FIG. 5) since it is not available in the application store yet (17040). The policy distribution point (5010*a*, 5010*b*, or 5010*c*) requests information about the application from the policy management point (11020), such as the application name, version, required privileges, etc. (17050), and the policy management point (11020) sends the requested information (17060) to the policy distribution point (5010*a*, 5010*b*, or 5010*c*). The policy distribution point (5010*a*, 5010*b*, or 5010*c*), or other designated component, uses the information to construct an application policy enforcement point for the application and submits it (17070) to the application store (11260). The policy distribution point (5010*a*, 5010*b*, or 5010*c*) also notifies (17080) the requesting policy management point (11020) that the application is now available in the application store (11260). Alternatively, the policy management point (11020) can poll the application store (11260) until the application policy enforcement point for the application appears as available for download. In either case, the policy management point (11020) requests (17090) the application policy enforcement point for the application from the application store (11260) and the application store delivers it (17100) for installation on the device (11000). The process can be implemented by those having ordinary skill in the art using the description and figures herein.

6.5.2.2 Policy Cache

In some embodiments, policy is cached by policy managers and/or policy enforcement points so that applications can be instantiated and used when a policy distribution point is not available (e.g. when there is no network access). Local caching also speeds policy enforcement point startup over what would be possible if policy distribution points had to be accessed to obtain policy. Policy cache integrity must be maintained, but privacy is only necessary for encryption keys. This can be implemented by those having ordinary skill in the art.

In some more particular embodiments of the forgoing, an initial policy cache is installed as part of a policy manager instance (e.g. when a first compartment is created) and is built into the policy manager, or created as part of a separate process upon the device. A policy cache can use application-local storage of the policy manager or policy cache process, shared compartment storage, OS-provided facilities, or a combination of these. For example, policy rules can be stored in policy-manager local storage while keys are stored in an OS-provided key storage facility.

6.5.2.3 Key Manager

In some embodiments, key managers provide key generation and management functions for the architecture. Key managers support the generation of local compartment-specific keys and the association of those keys with a particular compartment policy specification (for example, the keys required to access the common storage associated with a compartment, or to authenticate a component as being associated with a specific compartment). This can be implemented by those having ordinary skill in the art.

Key managers can utilize underlying device-specific capabilities for key generation and storage (e.g. device-specific key storage, such as the iOS "keychain" or Windows key storage). Alternatively, keys can be stored at a policy distribution point and obtained as needed by a key manager.

Keys can be generated on a device or in the policy cloud. Key generation can be performed by a policy distribution point, by a policy management point at the point of delegation or allocation, by a policy enforcement point, or any combination of these Key managers are responsible for managing any required user interaction to obtain key storage unlocking codes (such as pass-phrases) that are required to make local key storage accessible.

For example, to unlock a local file system, a policy enforcement point may need to request the file system key from a key manager. The key manager, in response to policy, has not stored the key on the device, but obtains it from a policy distribution point. This permits the policy distribution point to withhold the key to block access to the local file system, even if the user knows the local key cache access codes.

In some cases generated keys are added to policy, and propagated back to the policy management point that delegated the policy or policy distribution point that supplied it, so that the updated policy can be re-distributed or re-allocated as necessary, or so that the key can be added to a key escrow when such is desired or required. For example, when a policy management point allocates policy to a policy enforcement point generator, and the policy enforcement point generator generates a policy enforcement point, this can involve generating a key for use in authenticating the policy enforcement point and incorporate the key into the generated policy enforcement point. The key will also need to be known to components that must authenticate the generated application, so it can be added to the policy, and the policy is sent back to the policy management point that allocated the policy to the policy enforcement point generator. The policy management point can then allocate and/or delegate the updated policy as required.

6.5.2.4 Domain Import-Export Policy Enforcement Points (DIEPEPs)

FIG. 11 shows an embodiment of a DIEPEP (11010) enabling controlled inter-compartment interactions between application policy enforcement point A (11030) and application policy enforcement point B (11040), which for purposes of the present discussion are presumed to be in different compartments. In this case, the application policy enforcement points for Application A (11030) and Application B (11040) will not permit Application A (11035) to connect to Application B (11045) using IPC. Application policy enforcement points (11030 & 11040) will only permit IPC connections to application policy enforcement points that are in the same compartment, or to DIEPEPs (11010), so a direct IPC link will not be permitted as it would if the two applications were in the same compartment. Communication between Application A (11035) and Application B (11045) must go through the DIEPEP (11010) using links 11520 and 11530. The process can be implemented by those having ordinary skill in the art using the description and figures herein.

Figure 18:
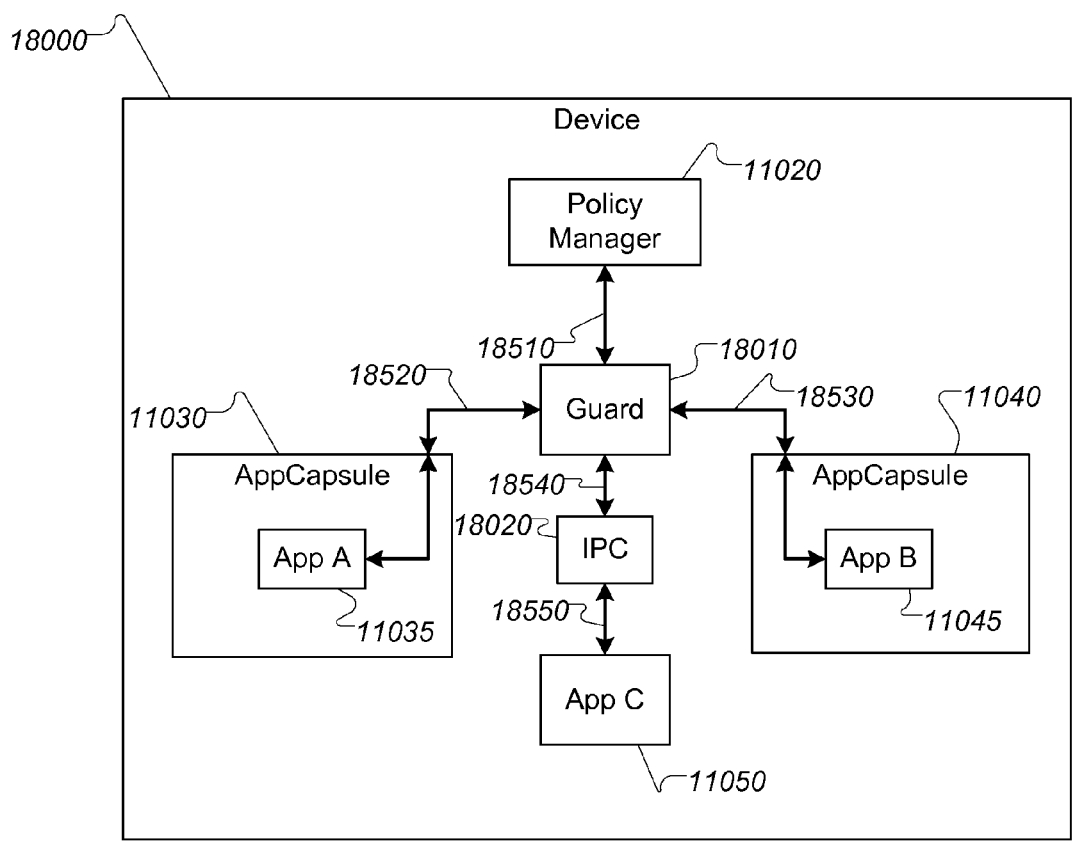
FIG. 18 is a diagram showing a DIEPEP mediating communications between two applications in different compartments and one global application, according to one embodiment of the invention.

FIG. 18 also shows how a DIEPEP (18010) supports communication with non-compartmented applications, such as Application C (11050). When Application A (11035) attempts to connect to Application C (11050) using IPC (18020), its application policy enforcement point (11030) intercepts the attempt, and re-routes it to a DIEPEP (18010). The DIEPEP (18010) checks policy for the compartment (18510) to determine whether the connection is allowed. This check can be by communication with a policy management point (11020), or by internal determination using stored compartment policy information already acquired by the DIEPEP. If policy permits the connection, the DIEPEP establishes IPC communication with Application C (18540, 18020, & 18550), and acts to pass information as needed. In passing the information the DIEPEP can filter the information based on policy requirements, translate formats as needed, or perform other filtering or manipulation of the data as required by policy or design of the DIEPEP.

In some embodiments, DIEPEPs are specially constructed applications that can interact with policy enforcement points from a plurality of compartments and/or global applications. On Android systems, these can be implemented as "providers". DIEPEPs function as "pipes" between policy enforcement points in different compartments, or between policy enforcement points and global applications. DIEPEPs move data between two compartments only when the policy of both compartments permits. DIEPEPs move data between a compartment and a global application only when the compartment policy permits.

In more specific embodiments, DIEPEPs are "data-aware" in that they can filter IPC content, not just connections. There may need to be different DIEPEPs for each type of connection supported by specific applications (File system, IPC, clipboard, calendar data, contact data, etc.)

In other more specific embodiments, DIEPEPs can permit contact list movement between applications, but only selected fields, while blocking/removing/modifying non-permitted fields.

In some embodiments, DIEPEPs are used as a policy enforcement point to encapsulate "content providers" used to manage data that is used by a plurality of applications in some OSs (e.g. Android).

6.5.2.5 Distributable Policy Enforcement Point Generator

One aspect of the policy management architecture provided by the present invention is the ability to allocate policy to one or more distributable policy enforcement points, and to create these distributable policy enforcement points dynamically. In some embodiments, this is performed by the distributable policy enforcement point generator. The distributable policy enforcement point generator may be implemented as part of a policy management point or as a stand-alone application that receives policy allocations.

In more specific embodiments, the distributable policy enforcement point generator receives policy allocated to it and produces one or more distributable policy enforcement points. The distributable policy enforcement points may be implemented as any type of policy enforcement point or as a DIEPEP application. Once generated, the distributable policy enforcement points may be distributed using policy distribution points, or may be distributed using common application distribution mechanisms such as "application stores" or application repositories.

A distributable policy enforcement point generator receives policy allocated to it by a policy management point. The allocated policy identifies a compartment or application to be protected. The distributable policy enforcement point is then generated, signed by the policy enforcement point generator, and made available to policy distribution points. In some implementations, making available means publishing the distributable policy enforcement point to an "application store" or other application distribution point. In these cases, distributable policy enforcement points are installed on devices in the same manner as any other application on the device.

In some cases policy can specify that generated distributable policy enforcement points be added to policy as required applications (e.g. identified by a dynamically generated application ID), and the modified policy propagated back to the policy management point that allocated the policy or the policy distribution point that supplied the policy, so that the updated policy can be re-distributed or re-allocated as necessary.

The instructions to instantiate a distributable policy enforcement point can, in some embodiments, be shared between distributable policy enforcement points. This can be true even when they are in different compartments, so long as policy that conflicts with a compartment's policy is not embedded in the program code.

Figure 19:
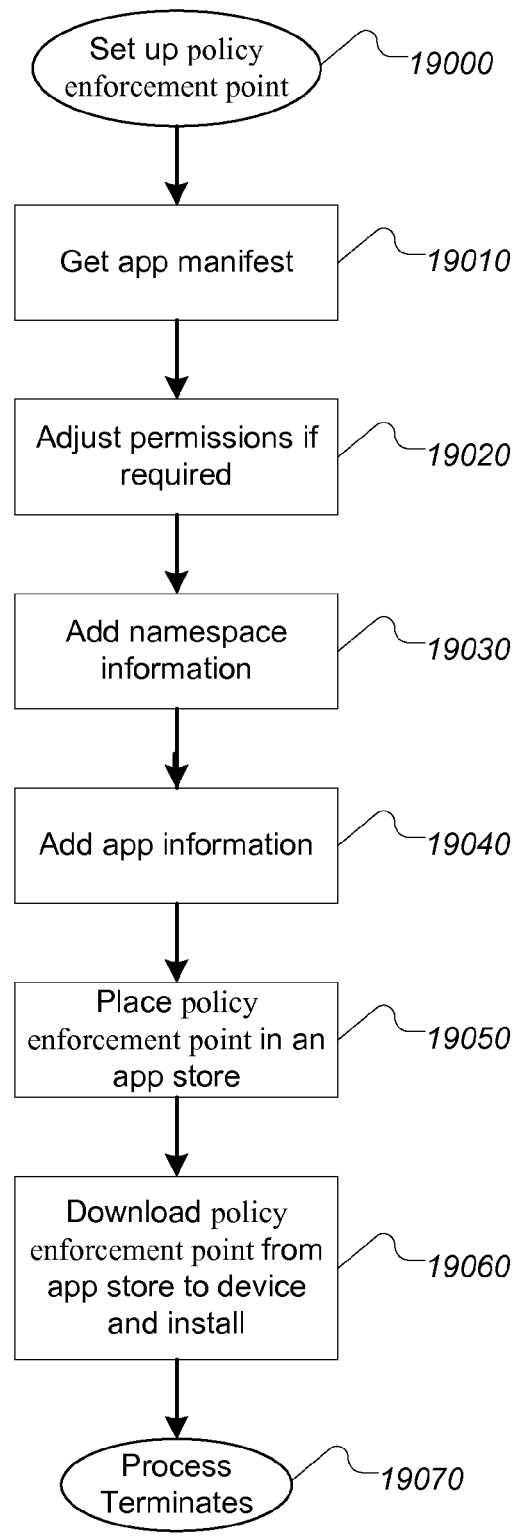
FIG. 19 is a flowchart describing setup of a policy enforcement point, according to one embodiment of the invention.

FIG. 19 is a flowchart showing the steps involved in creating an distributable application policy enforcement point for an application and installing it on a device (19000) according to one embodiment of the invention. The policy enforcement point generator (11212), which may be a function of a policy distribution point (5010*a*, 5010*b*, or 5010*c*) or a separate facility (not shown) depending on the specific implementation design, checks with the policy distribution point for the compartment (5010*a*, 5010*b*, or 5010*c*) to see if the application is permitted in the compartment. If it is not, the attempt to acquire the application policy enforcement point to enable the application to function in the compartment fails. The process can be implemented by those having ordinary skill in the art using the description and figures herein.

If the application is permitted in the compartment by policy, the policy enforcement point generator (11212) obtains a copy of the application's manifest and other information (19010) for use as a basis for creating the policy enforcement point's manifest or installer. This can be done by download from an application store, or be supplied from the requesting device when the application is already installed on the device in some embodiments. The policy enforcement point generator (11212) adjusts permissions in the application manifest or installer as required (19020). This can involve increasing some permissions to levels that permit a policy enforcement point to operate so as to encapsulate the application and/or reducing some permissions to levels permitted by policy. For example, if an application manifest permits use of shared storage, but policy for the application in a compartment does not, the policy enforcement point manifest permission for use of shared storage can be removed, so long as such storage is not required by the policy enforcement point.

The policy enforcement point generator (11212) also adds namespace information to the policy enforcement point manifest or installer 19030). Namespace information enables a policy enforcement point or other application (such as a policy management point (11020) to identify an application as a policy enforcement point for a particular compartment. Namespace information can be used to form some or all of a process ID, provide authentication information, be used to identify shared storage, or for other purposes.

The policy enforcement point generator (11212) then adds application information to the manifest or installer of the policy enforcement point (19040). This can comprise any information required by the application policy enforcement point to load the application for execution, including such things as the location of the application, whether the application is installed on the device, is to be downloaded from a server, or is stored in policy enforcement point-local storage on the device. It can also comprise any policy settings that are to be installed with the policy enforcement point, such as default policy settings or references to policy distribution points.

The policy enforcement point generator (11212) then creates any required certificates, and performs any actions required to place the policy enforcement point application into an application store (19050) where the device can access it. The application store can be a public application store provided by an OS supplier (such as the Android Application Store run by Google), or a private application store provided by a 3rd party or enterprise. The device then downloads and installs a policy enforcement point application (19060) from the appropriate application store as would be done for any application. This completes the process (19070).

7 Machine Implementation

As will be apparent to those having ordinary skill in the art, the present invention is implemented in digital electronic circuitry, or in computer hardware, firmware, software, or in combinations thereof. Software of the invention can be implemented in a computer program product tangibly embodied in a machine-readable storage (i.e., non-transitory) device for execution by a programmable processor; and method steps of the invention can be performed by a programmable processor executing a program of instructions to perform functions of the invention by operating on input data and generating output in the form of data structures encoded in memory devices and transformed using a processor that manipulates data in the form of signals retrieved from the memory and returns a transformed data structure in computer memory.

More particularly, as will be apparent to those having skill in the art, that while the disclosure herein refers to such terms as "compartments", "policies", and "policy management points", these refer to electronic computer data structures and instructions that are stored as signals in memory devices controlled, accessed, and executed by electronic computers in order to control the state of computer electronic data and instructions stored in computer-accessible memory, or the movement of electronic computer data and instructions among two or more computers as described herein. Often such operations occur without direct human interaction or even the knowledge of the users of the computers using the various aspects of the present invention.

The invention can be implemented advantageously in one or more computer programs that are executable on programmable systems including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; the language can be a compiled or interpreted language. Suitable processors include, by way of example, both general and special purpose microprocessors. Generally, a processor will receive instructions and data from a read-only memory or a random access memory or a combination thereof. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users. Finally, the processor can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and output to the network, for example, in the form of a computer data signal embodied in a carrier wave.

The above-described devices and materials will be familiar to those of skill in the computer hardware and software arts. It should be noted that the present invention employs various computer implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities. The present invention also relates to devices, systems or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

Thus, those having ordinary skill in the art will appreciate that the present invention meets the needs described above and possesses still more useful aspects and applications. A number of implementations of the invention have been described. Nevertheless, it will be understood that various modifications can be made without departing from the spirit and scope of the invention. Accordingly, other embodiments are within the scope of the description herein.

What is claimed:

1. A method for managing a plurality of disparate computer application and data control policies on a computing device, comprising:
   executing under electronic computer control an electronically encoded representation of at least one policy distribution point to receive a plurality of different data management policy elements from a plurality of different non-local policy distribution points in the electronic computer memory associated with said computing device, said electronically encoded representation of at least one policy distribution point including at least one electronically encoded information management policy;
   executing under electronic computer control a plurality of electronically encoded representations of policy enforcement points, including an electronically encoded representation of a first policy enforcement point operating at first policy enforcement level, and an electronically encoded representation of a second policy enforcement point operating at second policy enforcement level;
   allocating under electronic computer control an electronically encoded representation of a first policy element to said first policy enforcement point, and an electronically encoded representation of a second policy element to said second policy enforcement point;
   providing a plurality of management compartments in computer memory in communication with said computing device, each of said management compartments including electronically encoded representations of one or more computer applications, data, and metadata specified and controlled by said at least one information management policy; and
   moderating, by said plurality of policy enforcement points, interaction of the computer applications with other components according to the information management policy of each management compartment to which each application belongs, including permitting, blocking, logging, and modifying attempts to read or write data, open or accept connections, or access resources outside of each applications environment.

2. The method of claim 1, further comprising defining under electronic computer control the management of said one or more computer applications, data, and meta-data in said management compartment for at least one of a rest state, a motion state, or a use state.

3. The method of claim 2, further comprising defining under electronic computer control the management of computer applications that access data or metadata contained in said management compartment.

4. The method of claim 1, further comprising defining under electronic computer control the management of computer applications, data, and metadata contained within said management compartment.

5. The method of claim 1, further comprising defining under electronic computer control the management of computer applications, data, and metadata contained in two or more different management compartments.

6. The method of claim 1, further comprising defining under electronic computer control the management of computer applications, data, and metadata contained in two or more different instances of said management compartment.

7. The method of claim 1, further comprising distributing under electronic computer control said at least one information management policy through said one or more policy distribution points.

8. A system for managing a plurality of disparate computer application and data control policies on one or more computing devices, comprising:
- at least one policy distribution point to receive a plurality of different data management policy elements from a plurality of different non-local policy distribution points, said at least one policy distribution point comprising at least one information management policy;
- a plurality of policy enforcement points, including a first policy enforcement point operating at a first policy enforcement level and enforcing at least a first policy element of said at least one information management policy, and a second policy enforcement point operating at a second policy enforcement level and enforcing at least a second policy element of said at least one information management policy;
- computer memory comprising a plurality of management compartments in communication with said computing device, said management compartments including one or more computer applications, data, and metadata specified and controlled by said at least one information management policy; and
- the plurality of policy enforcement points further configured to moderate interaction of the computer applications with other components according to the information management policy of each management compartment to which each application belongs, including permitting, blocking, logging, and modifying attempts to read or write data, open or accept connections, or access resources outside of each applications environment.

9. The system of claim 8, wherein the management of said one or more computer applications, data, and metadata in said management compartment is defined for at least one of a rest state, a motion state, and a use state.

10. The system of claim 9, wherein said management compartment is configured to manage computer applications that access data or metadata contained in said management compartment.

11. The system of claim 10, wherein said management compartment is configured to manage computer applications, data, and metadata contained within said management compartment.

12. The system of claim 11, wherein said management compartment is configured to manage computer applications, data, and metadata contained in two or more different management compartments.

13. The system of claim 8, wherein said management compartment is configured to manage computer applications, data, and metadata contained within said management compartment.

14. The system of claim 8, wherein said management compartment is configured to manage computer applications, data, and metadata contained in two or more different management compartments.

15. The system of claim 8, further comprising defining the management of computer applications, data, and metadata contained in two or more different instances of said management compartment.

16. The system of claim 8, further comprising distributing said at least one information management policy through said one or more policy distribution points.

17. A non-transitory computer readable medium containing a computer program product providing data and instructions configured to enable a computer to manage a plurality of disparate computer application and data control policies on at least one computing device, said computer program product comprising instructions to enable said computer to:
- execute and operate a plurality of policy enforcement points configured to receive at least one information management policy provided by one or more policy distribution points operable to receive a plurality of different data management policy elements from a plurality of different non-local policy distribution points, said policy enforcement points further including a first policy enforcement point operating at a first policy enforcement level, and a second policy enforcement point operating at a second policy enforcement level, said first policy element being allocated to said first policy enforcement point, and said second policy element being allocated to said second policy enforcement point; and
- establish and operate a plurality of management compartments in computer memory in communication with said computing device, each of said management compartments including one or more computer applications, data, and metadata specified and controlled by said at least one information management policy; and
- moderate, by said plurality of policy enforcement points, interaction of the computer applications with other components according to the information management policy of each management compartment to which each application belongs, including permitting, blocking, logging, and modifying attempts to read or write data, open or accept connections, or access resources outside of each applications environment.

18. The non-transitory computer readable medium of claim 17, further comprising defining the management of said one or more computer applications, data, and metadata in said management compartment for at least one of a rest state, a motion state, and a use state.

19. The non-transitory computer readable medium of claim 18, further comprising defining the management of computer applications that access data or metadata contained in said management compartment.

20. The non-transitory computer readable medium of claim 19, further comprising defining the management of computer applications, data, and metadata contained within said management compartment.

21. The non-transitory computer readable medium of claim 20, further comprising defining the management of computer applications, data, and metadata contained two or more different management compartments.

22. The non-transitory computer readable medium of claim 17, further comprising defining the management of computer applications, data, and metadata contained within said management compartment.

23. The non-transitory computer readable medium of claim 17, further comprising defining the management of computer applications, data, and metadata contained in two or more different management compartments.

24. The non-transitory computer readable medium of claim 17, further comprising defining the management of computer applications, data, and metadata contained in two or more different instances of said management compartment.

25. The non-transitory computer readable medium of claim 17, further comprising distributing said at least one information management policy through said one or more policy distribution points.

* * * * *